US011858532B2

(12) United States Patent
Taveira et al.

(10) Patent No.: US 11,858,532 B2
(45) Date of Patent: Jan. 2, 2024

(54) GESTURE-BASED CONTROL FOR SEMI-AUTONOMOUS VEHICLE

(71) Applicant: QUALCOMM Incorporated, San Diego, CA (US)

(72) Inventors: Michael Franco Taveira, Rancho Santa Fe, CA (US); John Anthony Dougherty, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/893,112

(22) Filed: Jun. 4, 2020

(65) Prior Publication Data

US 2021/0380139 A1    Dec. 9, 2021

(51) Int. Cl.
*B60W 60/00*    (2020.01)
*B60W 40/08*    (2012.01)
(Continued)

(52) U.S. Cl.
CPC ........ *B60W 60/0025* (2020.02); *B60W 40/08* (2013.01); *B60W 60/0016* (2020.02);
(Continued)

(58) Field of Classification Search
CPC ............. B60W 60/0025; B60W 40/08; B60W 60/0016; B60W 2040/0809; B60W 2540/215; G06F 3/017
See application file for complete search history.

(56) References Cited

U.S. PATENT DOCUMENTS 10,394,245 B2    8/2019  Li et al.
10,503,172 B2    12/2019 Englard et al.
(Continued)

FOREIGN PATENT DOCUMENTS

DE    102017219440 A1    5/2019
DE    102018208889 A1    12/2019
(Continued)

OTHER PUBLICATIONS

KR-20180109826-A translation obtained from ESPACE.net (Year: 2018).*

(Continued)

*Primary Examiner* — James J Lee
*Assistant Examiner* — Wenyuan Yang
(74) *Attorney, Agent, or Firm* — QUALCOMM Incorporated

(57) ABSTRACT

Various embodiments include methods and vehicles, such as a semi-autonomous vehicle, for safely operating a vehicle based on vehicle-control gestures made by an occupant. Exemplary implementations may include determining a first vehicle action by applying a first passenger profile to a detected first vehicle-control gesture performed by a first passenger, determining whether the first vehicle action is safe to perform, and operating the vehicle to implement the first vehicle action in response to determining that the first vehicle action is safe for the vehicle and occupants. The first passenger profile may be selected from a plurality of passenger profiles to normalize vehicle-control gestures received from the first passenger. The vehicle control gesture may be ignored or a vehicle action differing from but similar to the first vehicle action may be implemented in response to determining that the first vehicle action is unsafe for the vehicle or occupants.

30 Claims, 12 Drawing Sheets

(51) Int. Cl.
*G06F 3/01* (2006.01)
*G06V 20/59* (2022.01)
*G06V 40/20* (2022.01)
*G06V 20/05* (2022.01)

(52) U.S. Cl.
CPC .............. *G06F 3/017* (2013.01); *G06V 20/05* (2022.01); *G06V 40/28* (2022.01); *B60W 2040/0809* (2013.01); *B60W 2540/215* (2020.02)

(56) References Cited

U.S. PATENT DOCUMENTS

| | | |
|---|---|---|
| 2013/0325482 A1 | 12/2013 | Tzirkel-Hancock et al. |
| 2014/0276090 A1* | 9/2014 | Breed .................. A61B 5/1455 600/473 |
| 2014/0309871 A1* | 10/2014 | Ricci ....................... B60R 25/00 701/36 |
| 2015/0251697 A1* | 9/2015 | Lavoie ................... B62D 13/06 701/523 |
| 2016/0357262 A1 | 12/2016 | Ansari |
| 2017/0210394 A1 | 7/2017 | Yamada et al. |
| 2017/0217445 A1 | 8/2017 | Tzirkel-Hancock et al. |
| 2018/0079427 A1* | 3/2018 | Herz ..................... G06F 3/0482 |
| 2018/0082134 A1 | 3/2018 | Sivaraman |
| 2019/0310627 A1* | 10/2019 | Halder ................. B60W 50/14 |
| 2020/0189595 A1* | 6/2020 | Bertollini ........... G06K 9/00845 |
| 2020/0406914 A1* | 12/2020 | Zhang ................... H04L 67/025 |
| 2021/0256316 A1* | 8/2021 | Ahire ................. G06K 9/00335 |

FOREIGN PATENT DOCUMENTS

| | | | |
|---|---|---|---|
| KR | 20180109826 A | * | 10/2018 |
| WO | 2014172380 A1 | | 10/2014 |
| WO | WO-2021179889 A1 | * | 9/2021 |

OTHER PUBLICATIONS

Translation of WO-2021179889-A1 obtained from ESPACE.net (Year: 2021).*
International Search Report and Written Opinion—PCT/US2021/030922—ISA/EPO—dated Jul. 13, 2021.

* cited by examiner

GESTURE-BASED CONTROL FOR SEMI-AUTONOMOUS VEHICLE

BACKGROUND

Automobiles and trucks are becoming more intelligent as the industry moves towards deploying autonomous and semi-autonomous vehicles. With the advent of fully and semi-autonomous vehicles, passengers may no longer need to use a conventional steering wheel for vehicle control. In fact, conventional steering wheels are costly and pose a danger to passengers in the event of a crash. However, a passenger may still occasionally want to steer or otherwise control navigation.

SUMMARY

Various aspects include methods and a vehicle, such as a semi-autonomous vehicle, implementing the methods for safely operating the vehicle based on vehicle-control gestures by a passenger. Various aspects may include determining a first vehicle action by applying a first passenger profile to a detected first vehicle-control gesture performed by a first passenger in which the first passenger profile is selected from a plurality of passenger profiles to normalize vehicle-control gestures received from the first passenger, and operating the vehicle to implement the first vehicle action in response to determining that the first vehicle action is safe for the vehicle and occupants. In some aspects, the plurality of passenger profiles may include a second passenger profile designated for a second passenger in which the second passenger profiles normalize vehicle-control gestures differently than the first passenger profile. Some aspects may further include identifying the first passenger based on at least one of a position of the first passenger in the vehicle, an input by the first passenger, or recognition of the first passenger, and selecting the first passenger profile based on the identity of the first passenger. In some aspects, the first passenger profile may be customized to the first passenger from training inputs previously receiving from the first passenger. Some aspects may further include receiving, from a remote computing device, the first passenger profile for application to vehicle-control gestures.

Some aspects may further include determining whether the first vehicle action associated with the detected first vehicle-control gesture is safe for the vehicle to execute, determining a second vehicle action that is a safer alternative to the first vehicle action in response to determining the first vehicle action is not safe for the vehicle to execute, and operating the vehicle to implement the second vehicle action. Some aspects may further include determining whether the first vehicle action associated with the detected first vehicle-control gesture is safe for the vehicle to execute after a determined delay period, and operating the vehicle to implement the first vehicle action after the determined delay period in response to determining that the first vehicle action associated with the detected first vehicle-control gesture is safe for the vehicle to execute after the determined delay period.

Some aspects may further include determining whether the first vehicle action includes an unusual vehicle operation, and determining whether the detected first vehicle-control gesture may include an added indication that the unusual vehicle operation is intended by the first passenger in response to determining that the first vehicle action may include the unusual vehicle operation, wherein operating the vehicle to implement the first vehicle action is further in response to determining that the detected first vehicle-control gesture may include the added indication that the unusual vehicle operation is intended by the first passenger. In some aspects, the added indication may include at least one of an exaggerated gesture, a repeated gesture, a gesture performed more quickly than usual, or a non-visual input received in conjunction with the detected first vehicle-control gesture. Some aspects may further include determining whether the unusual vehicle operation is safe for the vehicle or occupants, and operating the vehicle to implement a second vehicle action that is a safer alternative to the first vehicle action in response to determining that the unusual vehicle operation is not safe for the vehicle or occupants.

Further aspects include a vehicle control system with a processor configured to detect and implement vehicle-control gestures and perform operations of any of the methods summarized above. Further aspects include a non-transitory processor-readable storage medium having stored thereon processor-executable software instructions configured to cause a processor to perform operations of any of the methods summarized above. Further aspects include a vehicle control system having means for performing functions of any of the methods summarized above. Further aspects include a vehicle-control gesture system for use in a vehicle including a processor configured with processor-executable instructions to perform operations of any of the methods summarized above. Further aspects include a processing device configured for use in a vehicle control system and to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIGS. 2A and 2B are component block diagrams illustrating a vehicle suitable for implementing various embodiments.

DETAILED DESCRIPTION

Figure 1A:
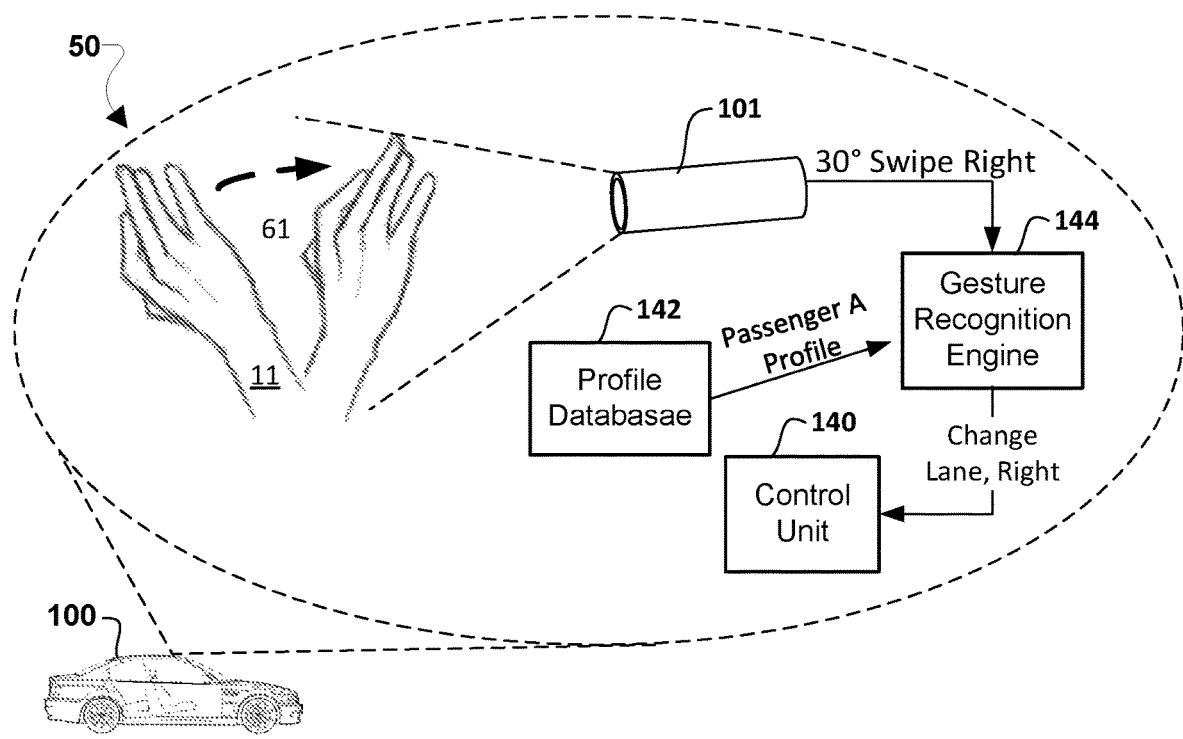
FIGS. 1A and 2B are schematic diagrams illustrating a vehicle gesture detection system suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments provide methods executed by a processor of a semi-autonomous vehicle for recognizing vehicle-control gestures by a passenger intended for steering and speed control of an autonomous vehicle. The processor may select a passenger profile from a plurality of passenger profiles to normalize vehicle-control gestures received from the passenger. The processor may determine a vehicle action, by applying the passenger profile or using generalized parameters that may apply to anyone, to a detected vehicle-control gesture performed by the passenger, and confirm that the detected vehicle-control gesture is safe for the vehicle to perform. The processor may execute a safe vehicle command in a safe manner regardless of the emphasis used by the passenger when making the vehicle-control gesture.

Various embodiments include a vehicle system configured to recognize gestures, made by a passenger, for controlling the semi-autonomous vehicle. The vehicle system may include sensors, including one or more cameras, and sensor processing capabilities (e.g., motion and/or image processing) to recognize certain passenger motions (i.e., gestures) as vehicle-control gestures made by a passenger. For example, a vehicle occupant swiping her hand in mid-air from left-to-right, pretending to turn a wheel to the right, pointing toward the right side of the vehicle, and/or giving a pre-defined other hand signal/movement may be designated and recognized as a vehicle-control gesture for turning right. Once the sensor processing capabilities recognize a designated vehicle-control gesture, a translation of that recognized vehicle-control gesture, representing a vehicle action, may be processed by a vehicle control unit for controlling the operation of the vehicle.

The process of recognizing vehicle-control gestures may consider historical records of passenger inputs. The historical records may serve as the basis for one or more passenger profiles, which reflect characteristics of how a passenger actually executes a given vehicle-control gesture, including consistent deviations from a model gesture. Each passenger profile may be specific to a particular passenger, associated with one or more particular seats within the vehicle (e.g., the traditional driver's seat), or may be generalized for any passenger and/or any seating position. Passenger profiles may be used to confirm that a detected gesture is consistent with the passenger's typical or prior inputs. Also, the passenger profiles may be used to better recognize valid inputs and reduce the chance of an erroneous gesture detection.

As used herein, the term "passenger" refers to an occupant of a vehicle, particularly a semi-autonomous vehicle, which may include one or more drivers and one or more other occupants of the vehicle.

As used herein, the term "passenger profile" refers to a set of data reflecting significant features of the way one or more passengers makes vehicle-control gestures or a particular vehicle-control gesture.

As used herein, the term "gesture" refers to a movement or pose using a part of a body, especially a hand and/or arm, to express an idea or meaning More particularly, the term "vehicle-control gesture" refers to a movement or pose that is configured to control one or more actions of a semi-autonomous or autonomous vehicle.

As used herein, the terms "safe" or "safety" are used synonymously and refer to conditions/circumstances that are protected from or not significantly exposed to danger. In various embodiments, conditions/circumstances may be considered safe when damage or injury to one or more passengers, the vehicle, and/or parts of the vehicle has a probability of occurring that is less than a threshold. While operating vehicles may always involve some level or risk, a predetermined low level of risk (i.e., the safety threshold) may be considered safe (i.e., acceptable). In addition, a processor may calculate separate probabilities of occurrence of damage or injury to more than one thing (e.g., passengers, the vehicle, and/or parts of the vehicle), as well as more than one type of damage or injury to those things. Also, the same or different safety thresholds may be applied to the calculation of risk for each of those things.

As used herein, the term "computing device" refers to an electronic device equipped with at least a processor, communication systems, and memory configured with a contact database. For example, computing devices may include any one or all of cellular telephones, smartphones, portable computing devices, personal or mobile multi-media players, laptop computers, tablet computers, 2-in-1 laptop/table computers, smartbooks, ultrabooks, palmtop computers, wireless electronic mail receivers, multimedia Internet-enabled cellular telephones, wearable devices including smart watches, entertainment devices (e.g., wireless gaming controllers, music and video players, satellite radios, etc.), and similar electronic devices that include a memory, wireless communication components and a programmable processor. In various embodiments, computing devices may be configured with memory and/or storage. Additionally, computing devices referred to in various example embodiments may be coupled to or include wired or wireless communication capabilities implementing various embodiments, such as network transceiver(s) and antenna(s) configured to communicate with wireless communication networks.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

Autonomous and semi-autonomous vehicles, such as cars and, trucks, buses, etc., are becoming a reality on roads. Also, autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable partial or full autonomous navigation. In accordance with various embodiments, the use of such sensors may be extended to the inside of the vehicle to detect vehicle-control gestures for passengers to control actions of the vehicle without the use of a traditional steering wheel, joystick, or similar direct mechanical control.

Figure 1B:
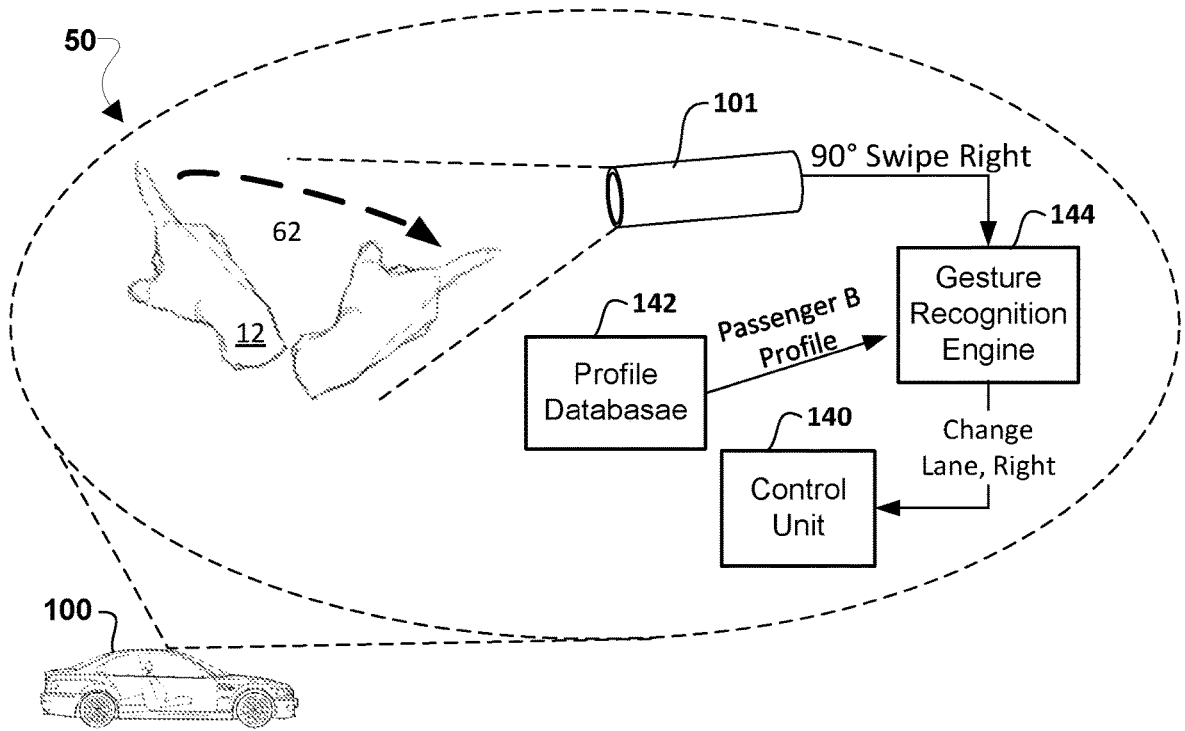

Various embodiments may be implemented within a variety of semi-autonomous vehicles that include a gesture detection system, of which an example vehicle gesture detection system 50 is illustrated in FIGS. 1A and 1B. With reference to FIGS. 1A and 1B, a vehicle gesture detection system 50 may include one or more sensor(s) 101, a profile database 142, and a gesture recognition engine 144, which are coupled to and/or work with a control unit 140 of a vehicle 100. The vehicle gesture detection system 50 may be configured to detect predefined gestures 61, 62 performed by passengers 11, 12 within the vehicle 100.

By using gestures, one or more passengers may provide a control input to a processor of the vehicle 100 without having to physically touch a steering wheel or other mechanical controller. The sensor(s) 101 may include motion sensors, proximity sensors, cameras, microphones, impact sensors, radar, lidar, satellite geo-positing system receivers, tire pressure sensors, and the like, which may be configured to capture images or other characteristics of motions and/or poses performed by passengers. The motions and/or poses may include all motions and/or poses, including both predefined gestures associated with one or more vehicle-control gestures, as well as other movements or poses not associated with vehicle controls. In this way, the sensor(s) 101 need not discriminate between types of movements or poses, but may convey data regarding the captured images or other characteristics to the gesture recognition engine 144 for analysis therein.

The profile database 142 may maintain a plurality of passenger profiles customized to normalize vehicle-control gestures for specific passengers, groups of passengers, and/or passengers in specific seats within the vehicle 100. The profile database 142 may be configured to convey data regarding one or more of the plurality of passenger profiles to the gesture recognition engine 144 for analysis therein.

A passenger profile may include data relating to how a specific person makes gestures and/or particular gestures that person has elected to use. Thus, the profile database 142 may include different passenger profiles designated for different people. Each specific person may be identified based on an input from the passenger or recognition of the identity of the passenger through the sensor(s) 101. In this way, the input from the passenger may provide an identity and/or a personalized passenger profile, which may be added or updated in the profile database 142. The input from the passenger may come from a user interface associated with the vehicle 100, a personal computing device of the passenger (e.g., smartphone), and/or another input device. Thus, the passenger profile may be selected based on the identity of the passenger and/or may be specific to a unique individual. Also, the passenger profile may be customized to the identified passenger from training inputs previously receiving from the passenger. Further, more than one passenger profile may be associated with a single unique individual. Thus, a person may select a particular passenger profile to suit their mood (e.g., tired, agitated, excited, etc.), the time of day, and/or other criteria.

Additionally or alternatively, the plurality of passenger profiles may be customized to normalize vehicle-control gestures for passengers in a particular seat or seats within the vehicle. For example, one passenger profile may be designated for any individual sitting in a designated "driver's seat" and one or more other passenger profiles designated for any individual sitting in other seats. As a further alternative, one passenger profile may be designated for all passengers, regardless of who they are or where they sit. Similarly, the profile database 142 may maintain one or more default passenger profiles for use if the passenger is not identified or if no customized passenger profile has been set up for that passenger.

In some implementations, the gesture recognition engine 144 may use neural network processing and/or artificial intelligence methods to determine whether the movements and/or poses captured by the sensor(s) 101 match predefined gestures associated with vehicle control. In addition, the gesture recognition engine 144 may use the data from the passenger profile received from the profile database 142 to determine which vehicle action was intended by the motion(s) and/or pose(s) captured by the sensor(s) 101. Thus, considering the movements or poses captured by the sensor(s) 101 and the passenger profile conveyed from the profile database 142, the gesture recognition engine 144 may convey, to the control unit 140, an instruction or data for the control unit 140 to operate the vehicle 100 in a way that implements a designated vehicle action. In various implementations, before initiating any vehicle action(s), the control unit 140 may ensure the designated vehicle action is safe for the vehicle 100 and occupants (e.g., passengers 11, 12).

Some vehicle actions can vary in amount or magnitude of change, such as acceleration, deceleration, and lane changes. In some implementations, in addition to matching the captured movements and/or poses to predefined gestures associated with vehicle controls, the gesture recognition engine 144 may also assess measurable parameters (e.g., angle, distance, etc.) of the captured movements to interpret the intended vehicle control input. For ease of description, rotational angle or degree, distance or sweep of the gesture, speed of movement of the gesture, acceleration during the gesture and other measurable parameters of an observed gesture are referred to herein as the "extent" of the captured movements. The gesture recognition engine 144 may interpret the extent of a captured movement to determine a magnitude of the vehicle movement intended by the person making the gesture. For example, a passenger could swipe her hand through the air in a 15-degree arch to convey a command to change lanes, but only one lane, in the direction of the swipe. A similar swipe spanning 45-degrees or more may signify a command to change two lanes in the direction of the swipe. In this way, the extent of the captured movements and/or poses may correspond to the amount or magnitude of the resulting vehicle action. In some embodiments, the extent of the captured movements and/or poses that is considered by the gesture recognition engine 144 may vary by type of action. For example, the extent (e.g., degree or amount of movement) in a gesture for a vehicle turn may be different than degree or amount of movement for a gesture that makes the vehicle stop or slow down.

In some embodiments, the interpretation of passenger movements as vehicle control gestures, and particularly the interpretation of the extent of detected gestures for determining intended vehicle actions or commands may vary from passenger to passenger, and may be saved in passenger profiles or historical data, reflected in training data, etc. For example, the extent of a gesture may vary with the size of the individual. Also, the extent of a gesture may vary with personality as some people may be more expressive or exaggerate gestures, while others may make small gestures.

In some embodiments, the amount of vehicle redirection or speed change corresponding to a passenger gesture may depend, linearly or non-linearly, on the extent of the captured movements. For example, a 5-degree movement of a finger, hand or arm may cause the vehicle make (i.e., correspond to) a single-lane change, a 15-degree movement may correspond to a two-lane change (i.e., since this is a more drastic maneuver), and a 60-degree movement may correspond to a three-lane change (i.e., even more drastic).

In some embodiments, the determined extent of the captured movements may be capped (i.e., not interpreted to extend beyond a maximum degree, distance or speed) for purposes of determining a corresponding command vehicle redirection or speed change. In some embodiments, such a cap or maximum imposed on interpreting always, under certain circumstances, or for only certain types of gestures). For example, while 5-degree, 10-degree, and 15-degree movements may correspond to a one, two, and three-lane change, respectively, the gesture recognition engine 144 may not interpret a 20-degree turn indicate a four lane change if the lane change gesture is capped to 15-degree movements.

In some embodiments in which the extent of captured movements and/or poses is taken into account, measured movements may be rounded (down/up) into particular extent increments appropriate for a particular gesture. For example, if a 5-degree hand movement is associated with a single-lane change and a 10-degree hand movement is associated with a two-lane change, then a 7-degree hand movement may be associated with only the single-lane change. In some embodiments, the safer choice of the single-lane change or the two-lane change will be selected. Alternatively or additionally, the passenger may provide some added indication that a partial lane change is intended (i.e., so the vehicle ends up straddling two lanes), such as to indicate that the 7-degree hand movement should be interpreted as a one and a half lane change.

In some embodiments, passenger inputs other than movements may be interpreted as vehicle-control gestures by the gesture recognition engine 144, either as alternatives or in addition to movement gestures. For example, the gesture recognition engine 144 may recognize (but is not limited to) voice commands, touch controls on any touch-sensitive surface (e.g., on a steering wheel, touch-screen, arm rest, seat belt, etc.), and/or remote controller inputs, such as inputs on a mobile device app, gamepad controller, a detachable steering wheel, or other remote controller that can be passed to whichever passenger wants to input a command.

In some embodiments, the gestures or other commands may be received from a party outside of the vehicle (e.g., via radio module 172). Thus, the gesture recognition engine 144 may recognize such remote commands for controlling the vehicle. Alternatively, a device (e.g., a wireless communication device 190) may be configured with a gesture recognition engine 144 for recognizing gestures or commands for controlling the vehicle and then sending corresponding commands to the vehicle for execution. For example, a vehicle owner (who is remote from the vehicle) can provide a gesture or command to cause the vehicle to change lanes, change speed, etc. As another example, a passenger may exit the vehicle with a detachable steering wheel (or other input device) to control the vehicle from outside the vehicle (e.g., to provide a different view while parking in a tight space).

In some embodiments, a passenger may perform a sequence of vehicle-control gestures for the vehicle to execute a series of corresponding maneuvers. In some embodiments, the gesture recognition engine 144 may indicate (e.g., with a tone, light, vibration, etc.) that a gesture has been recognized, and the passenger may wait for one gesture to be acknowledged or executed before performing the next gesture. In some embodiments, the gesture recognition engine 144 or the control unit 140 may cause the vehicle to perform the series of maneuvers in the order that they were presented. Alternatively, the gesture recognition engine 144 or the control unit 140 may cause the vehicle to perform each maneuver when each maneuver becomes safe to do or after receiving further passenger input (e.g., following a prompt). Additionally, or as a further alternative, the gesture recognition engine 144 may prompt the user before performing a vehicle action, such as one of a series of actions, if before executing the vehicle action, the vehicle action becomes unsafe to execute. For example, if a passenger performs a series of vehicle-control gestures designed to slow down and then make a turn, the vehicle control unit 140 may not perform the turn if after slowing down the vehicle is blocked from making the turn.

With reference to FIGS. 1A and 1B, the first passenger 11 is illustrated as performing a first vehicle-control gesture 61 and the second passenger 12 is illustrated as performing a second vehicle-control gesture 62, respectively. The first vehicle-control gesture 61 involves the first passenger 11 moving or swiping an open-palm hand in the air from left to right, following an arched angle of movement. In this instance, the sensor(s) 101 detect a thirty-degree (30°) swipe from left to right (i.e., "30° Swipe Right"). The second vehicle-control gesture 62 involves the second passenger 12 moving or swiping a finger-pointing hand in the air from left to right, following an arched angle of movement. In contrast to the first vehicle-control gesture 61, which uses an open hand and only extends across a 30-degree angle, the second vehicle-control gesture 62 uses a partially closed hand with a pointing finger that extends across a 90-degree angle. However, the gesture recognition engine 144, after normalizing each of the first and second vehicle-control gestures 61, 62 using the first and second passenger profiles A, B, may determine that both passengers 11, 12 want the vehicle to change lanes to the right. Thus, in both instances, the gesture recognition engine 144 may output the same vehicle action to the control unit 140 to change lanes; to the right lane.

The gesture recognition engine 144 may output many different types and degrees of vehicle action to the control unit 140 for operating the vehicle 100 to implement a vehicle action associated with the recognized gesture 61, 62.

Figure 2A:
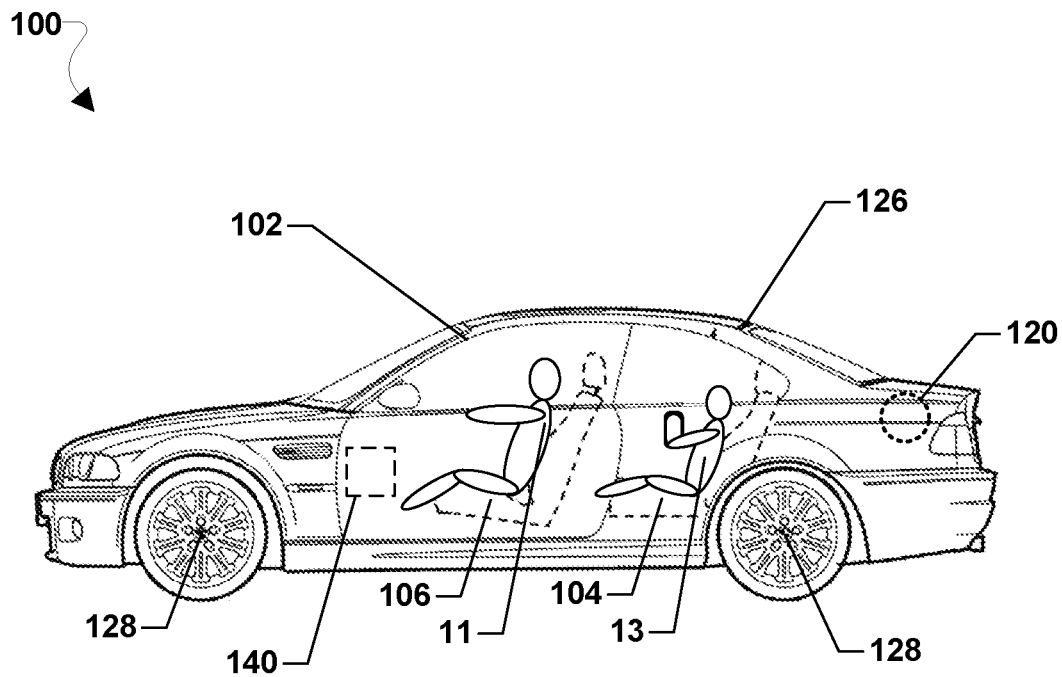
Figure 2B:
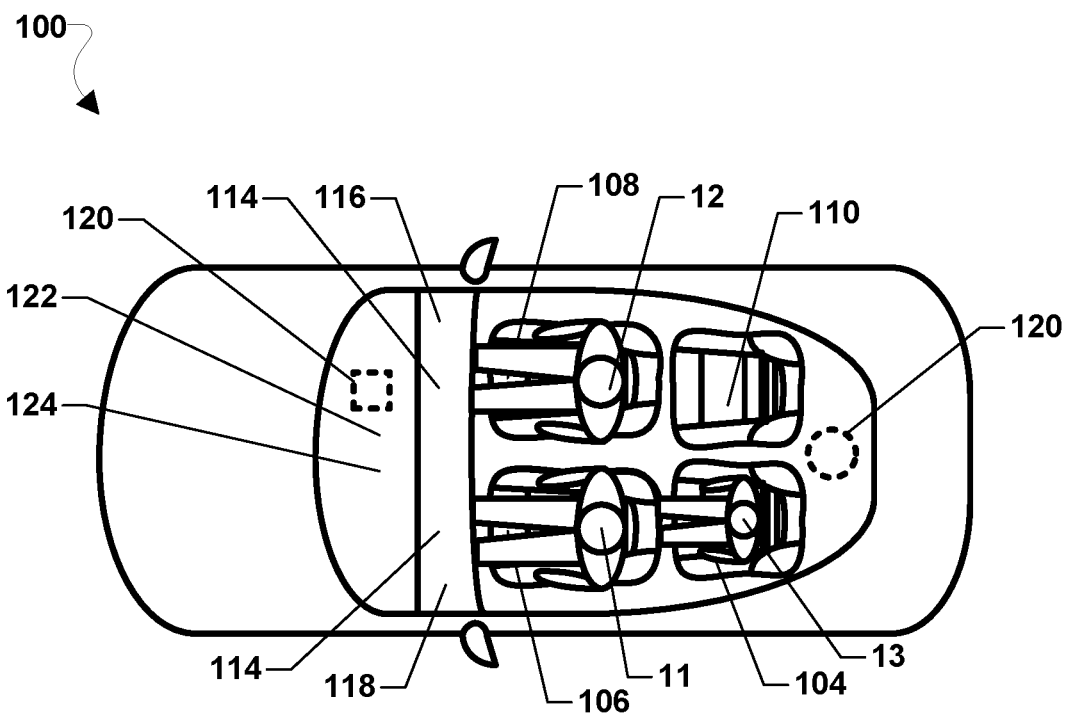

Various embodiments may be implemented within a variety of vehicles, an example vehicle 100 of which is illustrated in FIGS. 2A and 2B. With reference to FIGS. 2A and 2B, the vehicle 100 may include a control unit 140 and a plurality of sensors. In FIGS. 2A and 2B, the plurality of sensors described generally with regard to FIG. 1 are described separately. In particular, the plurality of sensors may include occupancy sensors 102, 104, 106, 108, 110 (e.g., motion and/or proximity sensors), cameras 112, 114, microphones 116, 118, impact sensors 120, radar 122, lidar 124, satellite geo-positioning system receivers 126, tire pressure sensors 128. The plurality of sensors 102-128, disposed in or on the vehicle, may be used for various purposes, such as vehicle gesture detection and/or autonomous and semi-autonomous navigation and control, crash avoidance, position determination, vehicle-control gesture detection, etc., as well providing sensor data regarding objects and people in or near the vehicle 100. The sensors 102-128 may include one or more of a wide variety of sensors capable of detecting a variety of information useful for receiving input about environments inside and outside the vehicle 100, as well as navigation control and collision avoidance. Each of the sensors 102-128 may be in wired or wireless communication with the control unit 140, as well as with each other. In particular, the sensors 102-128 may include one or more cameras 112, 114, which include or consist of other optical, photo optic, and/or motion sensors. The sensors 102-128 may further include other types of object detection and ranging sensors, such as radar 122, lidar 124, IR sensors, and ultrasonic sensors. The sensors 102-128 may further include tire pressure sensors 128, humidity sensors, temperature sensors, satellite geo-positioning system receivers 126, accelerometers, vibration sensors, gyroscopes, gravimeters, impact sensors 120, force meters, stress meters, strain sensors, microphones 116, 118, occupancy sensors 102, 104, 106, 108, 110, which may include motion and/or proximity sensors, and a variety of environmental sensors.

The vehicle control unit 140 may be configured to operate the vehicle 100 based on vehicle actions interpreted from vehicle-control gestures by one or more passengers 11, 12, 13 and a passenger profile in accordance with various embodiments. Additionally, the control unit 140 may have a default setting for one or more passenger profiles. For example, based on the currently loaded passenger profile, the default setting may cause the vehicle to operate more or less smoothly, efficiently, quickly, slowly, etc. The default setting may be followed, for example, when the control unit 140 does not recognize the passenger (i.e., no passenger profile match). Alternatively, when the control unit 140 does not recognize the passenger, a new profile may be created for that unknown person, for example, based on that person's actions (e.g., gestures/poses).

The vehicle control unit 140 may be configured with processor-executable instructions to perform various embodiments using information received from various sensors, particularly the cameras 112, 114, microphones 116, 118, occupancy sensors 102, 104, 106, 108, 110. In some embodiments, the control unit 140 may supplement the processing of camera images using distance and relative position (e.g., relative bearing angle) that may be obtained from radar 122, lidar 124, and/or other sensors. The control unit 140 may further be configured to control the direction, braking, speed, acceleration/deceleration, and/or the like of the vehicle 100 when operating in an autonomous or semi-autonomous mode using information regarding other vehicles and/or vehicle-control gestures from passengers determined using various embodiments.

Figure 3:
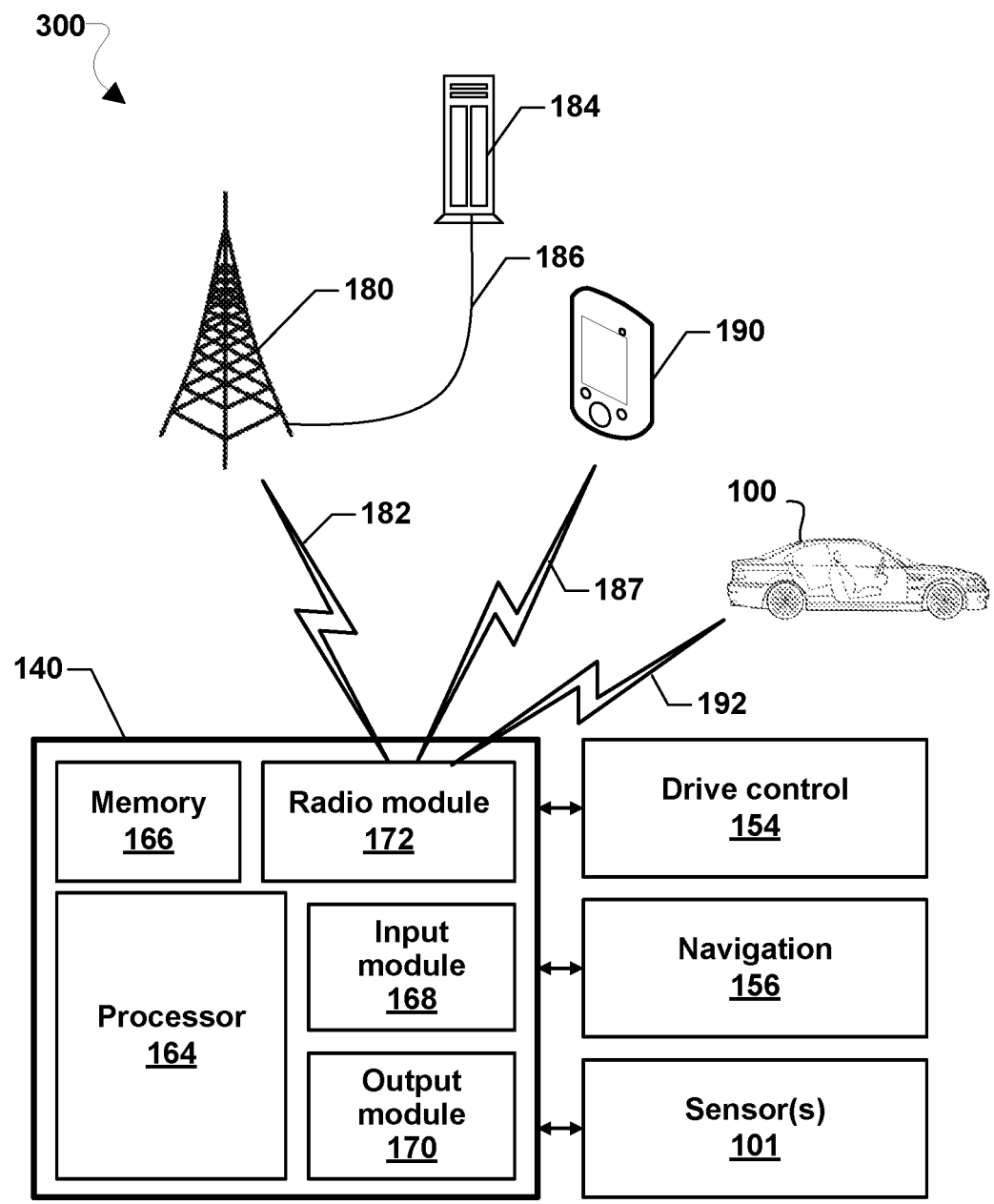
FIG. 3 is a component block diagram illustrating components of a vehicle suitable for implementing various embodiments.

FIG. 3 is a component block diagram illustrating a system 300 of components and support systems suitable for implementing various embodiments. With reference to FIGS. 1A-3, the vehicle 100 may include the control unit 140, which may include various circuits and devices used to control the operation of the vehicle 100. In the example illustrated in FIG. 3, the control unit 140 includes a processor 164, memory 166, an input module 168, an output module 170 and a radio module 172. The control unit 140 may be coupled to and configured to control drive control components 154, navigation components 156, and one or more sensors 101 of the vehicle 100.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 that may be configured with processor-executable instructions to determine vehicle-control gestures and/or alternatives thereto, and control maneuvering, navigation, and/or other operations of the vehicle 100, including operations of various embodiments. The processor 164 may be coupled to the memory 166. The control unit 162 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a communication network 180. The radio module 172 may provide the signals 182 to the processor 164 and/or the navigation components 156. In some embodiments, the radio module 172 may enable the vehicle 100 to communicate with a wireless communication device 190 through a wireless communication link 187. The wireless communication link 187 may be a bidirectional or unidirectional communication link. The wireless communication link 187 may use one or more communication protocols. In some embodiments, the radio module 172 may enable the vehicle 100 to communicate with another vehicle through a wireless communication link 192. The wireless communication link 192 may be a bidirectional or unidirectional communication link and the wireless communication link 192 may use one or more communication protocols.

The input module 168 may receive sensor data from one or more vehicle sensors 101 as well as electronic signals from other components, including the drive control components 154 and the navigation components 156. The output module 170 may be used to communicate with or activate various components of the vehicle 100, including the drive control components 154, the navigation components 156, and the sensor(s) 101.

The control unit 140 may be coupled to the drive control components 154 to control physical elements of the vehicle 100 related to maneuvering and navigation of the vehicle, such as (but not limited to) the engine, motors, throttles, directing elements, flight control elements, braking or deceleration elements, and the like. The drive control components 154 may also or alternatively include components that control other devices of the vehicle, including (but not limited to) environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156 and be configured to use such data to determine the present position and orientation of the vehicle 100. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using a wireless connection signal 182 with a cellular data communication network 180 to receive commands to control maneuvering, receive data useful in navigation, provide real-time position reports, and assess other data. The control unit 140 may be coupled to the one or more sensors 101, which may be configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 4A:
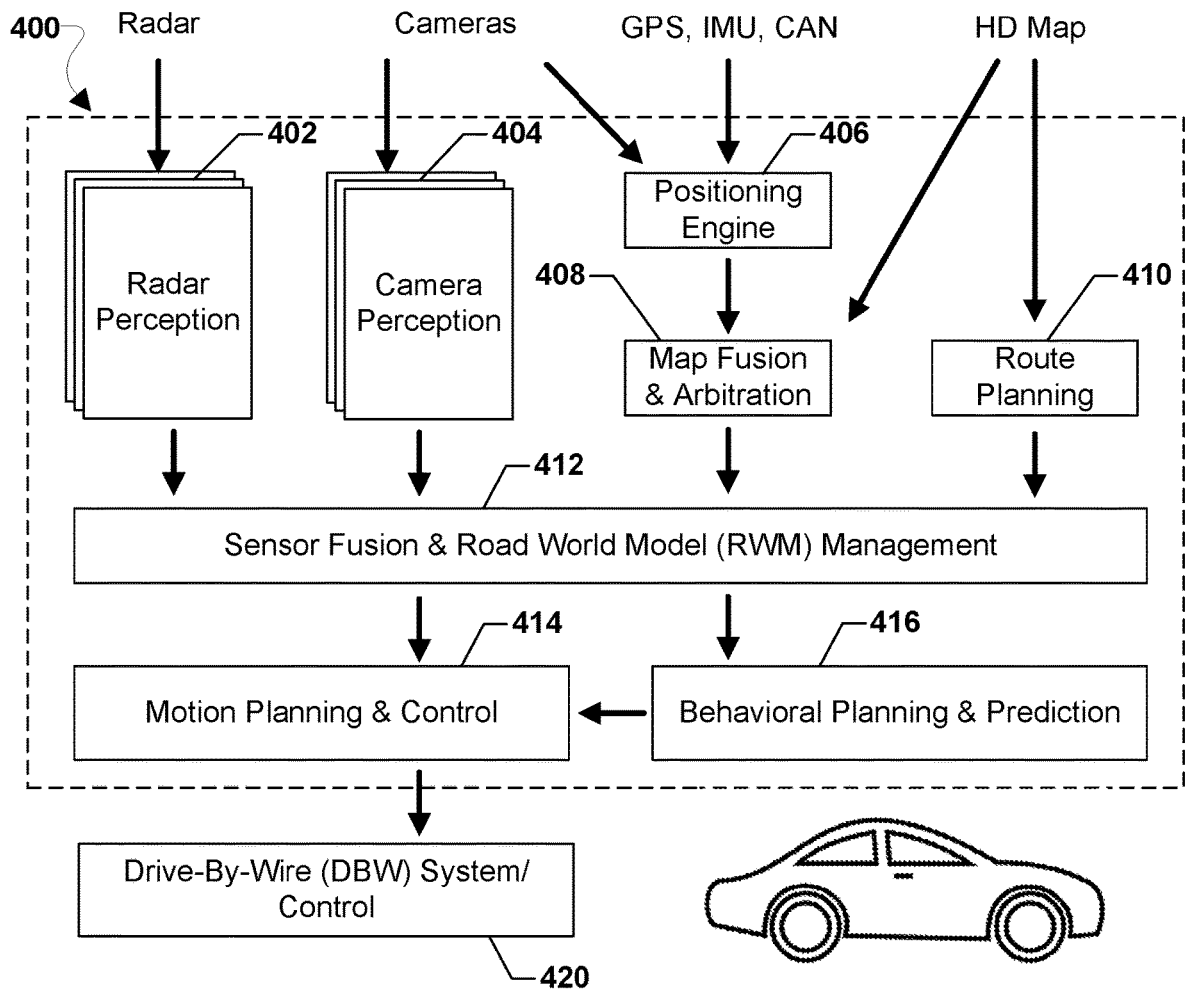
FIG. 4A is a component block diagram illustrating components of an example vehicle management system according to various embodiments.

FIG. 4A illustrates an example of subsystems, computational elements, computing devices or units within a vehicle management system 400, which may be utilized within a vehicle (e.g., 100). With reference to FIGS. 1A-4A, in some embodiments, the various computational elements, computing devices or units within vehicle management system 400 may be implemented within a system of interconnected computing devices (i.e., subsystems), that communicate data and commands to each other (e.g., indicated by the arrows in FIG. 4A). In other embodiments, the various computational elements, computing devices or units within vehicle management system 400 may be implemented within a single computing device, such as separate threads, processes, algorithms or computational elements. Therefore, each subsystem/computational element illustrated in FIG. 4A is also generally referred to herein as "layer" within a computational "stack" that constitutes the vehicle management system 400. However, the use of the terms layer and stack in describing various embodiments are not intended to imply or require that the corresponding functionality is implemented within a single autonomous (or semi-autonomous) vehicle management system computing device, although that is a potential embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system 400 may include a radar perception layer 402, a camera perception layer 404, a positioning engine layer 406, a map fusion and arbitration layer 408, a route planning layer 410, sensor fusion and road world model (RWM) management layer 412, motion planning and control layer 414, and behavioral planning and prediction layer 416. The layers 402-416 are merely examples of some layers in one example configuration of the vehicle management system 400. In other configurations consistent with various embodiments, one or more other layers may be included, such as (but not limited to) additional layers for other perception sensors (e.g., camera perception layer, etc.), additional layers for planning and/or control, additional layers for modeling, etc., and/or certain of the layers 402-416 may be excluded from the vehicle management system 400.

Each of the layers 402-416 may exchange data, computational results, and commands as illustrated by the arrows in FIG. 4A. Further, the vehicle management system 400 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 400 may output vehicle control commands or signals to the drive-by-wire (DBW) system/control unit 420, which is a system, subsystem, or computing device that interfaces directly with the vehicle direction, throttle, and brake controls. The configuration of the vehicle management system 400 and DBW system/control unit 420 illustrated in FIG. 4A is merely an example configuration and other configurations of a vehicle management system and other vehicle components may be used in the various embodiments. As an example, the configuration of the vehicle management system 400 and DBW system/control unit 420 illustrated in FIG. 4A may be used in a vehicle configured for autonomous or semi-autonomous operation while a different configuration may be used in a non-autonomous vehicle.

The radar perception layer 402 may receive data from one or more detection and ranging sensors, such as radar (e.g., 122) and/or lidar (e.g., 124). The radar perception layer 402 may process the data to recognize and determine locations of other vehicles and objects within a vicinity of the vehicle 100. In some implementations, the radar perception layer 402 may include the use of neural network processing and artificial intelligence methods to recognize objects and vehicles. The radar perception layer 402 may pass such information on to the sensor fusion and RWM management layer 412.

The camera perception layer 404 may receive data from one or more cameras, such as cameras (e.g., 112, 114), and process the data to detect vehicle-control gestures, as well as recognize and determine locations of other vehicles and objects within a vicinity of the vehicle 100. In some implementations, the camera perception layer 404 may include use of neural network processing and artificial intelligence methods to recognize objects and vehicles, and pass such information on to the sensor fusion and RWM management layer 412.

The positioning engine layer 406 may receive data from various sensors and process the data to determine a position of the vehicle 100. The various sensors may include, but is not limited to, GPS sensor, an IMU, and/or other sensors connected via a CAN bus. The positioning engine layer 406 may also utilize inputs from one or more cameras, such as cameras (e.g., 112, 114) and/or any other available sensor, such as radar (e.g., 122), lidar (e.g., 124), etc.

The map fusion and arbitration layer 408 may access data within a high definition (HD) map database and receive output received from the positioning engine layer 406 and process the data to further determine the position of the vehicle within the map, such as location within a lane of traffic, position within a street map, etc. The HD map database may be stored in a memory (e.g., memory 166). For example, the map fusion and arbitration layer 408 may convert latitude and longitude information from GPS into locations within a surface map of roads contained in the HD map database. GPS position fixes include errors, so the map fusion and arbitration layer 408 may function to determine a best-guess location of the vehicle within a roadway based upon an arbitration between the GPS coordinates and the HD map data. For example, while GPS coordinates may place the vehicle near the middle of a two-lane road in the HD map, the map fusion and arbitration layer 408 may determine from the direction of travel that the vehicle is most likely aligned with the travel lane consistent with the direction of travel. The map fusion and arbitration layer 408 may pass map-based location information to the sensor fusion and RWM management layer 412.

The route planning layer 410 may utilize the HD map, as well as inputs from an operator or dispatcher to plan a route to be followed by the vehicle to a particular destination. The route planning layer 410 may pass map-based location information to the sensor fusion and RWM management layer 412. However, the use of a prior map by other layers, such as the sensor fusion and RWM management layer 412, etc., is not required. For example, other stacks may operate and/or control the vehicle based on perceptual data alone without a provided map, constructing lanes, boundaries, and the notion of a local map as perceptual data is received.

The sensor fusion and RWM management layer 412 may receive data and outputs produced by the radar perception layer 402, camera perception layer 404, map fusion and arbitration layer 408, and route planning layer 410, and use some or all such inputs to estimate or refine the location and state of the vehicle in relation to the road, other vehicles on the road, and other objects within a vicinity of the vehicle. For example, the sensor fusion and RWM management layer 412 may combine imagery data from the camera perception layer 404 with arbitrated map location information from the map fusion and arbitration layer 408 to refine the determined position of the vehicle within a lane of traffic.

As another example, the sensor fusion and RWM management layer 412 may combine object recognition and imagery data from the camera perception layer 404 with object detection and ranging data from the radar perception layer 402 to determine and refine the relative position of other vehicles and objects in the vicinity of the vehicle. As another example, the sensor fusion and RWM management layer 412 may receive information from vehicle-to-vehicle (V2V) communications (such as via the CAN bus) regarding other vehicle positions and directions of travel, and combine that information with information from the radar perception layer 402 and the camera perception layer 404 to refine the locations and motions of other vehicles. The sensor fusion and RWM management layer 412 may output refined location and state information of the vehicle, as well as refined location and state information of other vehicles and objects in the vicinity of the vehicle, to the motion planning and control layer 414 and/or the behavior planning and prediction layer 416.

As a further example, the sensor fusion and RWM management layer 412 may use dynamic traffic control instructions directing the vehicle to change speed, lane, direction of travel, or other navigational element(s), and combine that information with other received information to determine refined location and state information. The sensor fusion and RWM management layer 412 may output the refined location and state information of the vehicle, as well as refined location and state information of other vehicles and objects in the vicinity of the vehicle, to the motion planning and control layer 414, the behavior planning and prediction layer 416 and/or devices remote from the vehicle, such as a data server, other vehicles, etc., via wireless communications, such as through C-V2X connections, other wireless connections, etc.

As a still further example, the sensor fusion and RWM management layer 412 may monitor perception data from various sensors, such as perception data from a radar perception layer 402, camera perception layer 404, other perception layer, etc., and/or data from one or more sensors themselves to analyze conditions in the vehicle sensor data. The sensor fusion and RWM management layer 412 may be configured to detect conditions in the sensor data, such as sensor measurements being at, above, or below a threshold, certain types of sensor measurements occurring, etc., and may output the sensor data as part of the refined location and state information of the vehicle provided to the behavior planning and prediction layer 416 and/or devices remote from the vehicle, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 416 of the autonomous vehicle management system 400 may use the refined location and state information of the vehicle and location and state information of other vehicles and objects output from the sensor fusion and RWM management layer 412 to predict future behaviors of other vehicles and/or objects. For example, the behavioral planning and prediction layer 416 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction layer 416 may output other vehicle and object behavior and location predictions to the motion planning and control layer 414.

Additionally, the behavior planning and prediction layer 416 may use object behavior in combination with location predictions to plan and generate control signals for controlling the motion of the vehicle. For example, based on route planning information, refined location in the roadway information, and relative locations and motions of other vehicles, the behavior planning and prediction layer 416 may determine that the vehicle needs to change lanes and accelerate, such as to maintain or achieve minimum spacing from other vehicles, and/or prepare for a turn or exit. As a result, the behavior planning and prediction layer 416 may calculate or otherwise determine a steering angle for the wheels and a change to the throttle setting to be commanded to the motion planning and control layer 414 and DBW system/control unit 420 along with such various parameters necessary to effectuate such a lane change and acceleration. One such parameter may be a computed steering wheel command angle.

The motion planning and control layer 414 may receive data and information outputs from the sensor fusion and RWM management layer 412 and other vehicle and object behavior as well as location predictions from the behavior planning and prediction layer 416. The motion planning and control layer 414 may use (at least some of) this information to plan and generate control signals for controlling the motion of the vehicle and to verify that such control signals meet safety requirements for the vehicle. For example, based on route planning information, refined location in the roadway information, and relative locations and motions of other vehicles, the motion planning and control layer 414 may verify and pass various control commands or instructions to the DBW system/control unit 420.

The DBW system/control unit 420 may receive the commands or instructions from the motion planning and control layer 414 and translate such information into mechanical control signals for controlling wheel angle, brake and throttle of the vehicle. For example, DBW system/control unit 420 may respond to the computed steering wheel command angle by sending corresponding control signals to the steering wheel controller.

In various embodiments, the vehicle management system 400 may include functionality that performs safety checks or oversight of various commands, planning or other decisions of various layers that could impact vehicle and occupant safety. Such safety checks or oversight functionality may be implemented within a dedicated layer or distributed among various layers and included as part of the functionality.

In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 416 (or in a separate layer) may determine the current or future separate distance between another vehicle (as defined by the sensor fusion and RWM management layer 412) and the vehicle (e.g., based on the world model refined by the sensor fusion and RWM management layer 412), compare that separation distance to a safe separation distance parameter stored in memory, and issue instructions to the motion planning and control layer 414 to speed up, slow down or turn if the current or predicted separation distance violates the safe separation distance parameter. As another example, safety or oversight functionality in the motion planning and control layer 414 (or a separate layer) may compare a determined or commanded steering wheel command angle to a safe wheel angle limit or parameter, and issue an override command and/or alarm in response to the commanded angle exceeding the safe wheel angle limit.

According to various implementations, some safety parameters stored in memory may be static (i.e., unchanging over time), such as maximum vehicle speed. For example, operating a vehicle over 120 mph (or some other value that may be set by the manufacturer, vehicle owner, etc.) may be considered dangerous and therefore the vehicle (e.g., gesture recognition engine 144 and/or control unit 140) would impose maximum safety parameters related to speed. With autonomous vehicles, operating at speeds in excess of 120 mph may still be safe, thus a higher value could be used. Alternatively, some safety parameters (e.g., max speed) may be dynamic and change depending on location, driving conditions (e.g., traffic volume), and/or external inputs (e.g., signals from an intelligent transportation system). For example, a maximum speed may have one value for driving in densely populated areas or more confined roadways (i.e., city driving) and another value for driving in less populated areas or roadways with many lanes (i.e., highway driving). Other safety parameters, such as proximity to objects (e.g., other vehicles), people, creatures, or other elements, may be used. In addition, other safety parameters stored in memory may be dynamic in that the parameters are determined or updated continuously or periodically based on vehicle state information and/or environmental conditions. Non-limiting examples of safety parameters may include maximum speed, minimum speed, maximum deceleration (e.g., braking speed), maximum acceleration, and maximum wheel angle limit Any or all of these may be a function of occupant(s), roadway, and/or weather conditions. For example, if an occupant is sleeping, inebriated, or distracted (e.g., reading, not facing/looking forward, etc.) that occupant may be less likely to give an appropriate command and/or not be able to properly navigate the vehicle as compared to other times when the occupant is alert and not distracted for instance.

Figure 4B:
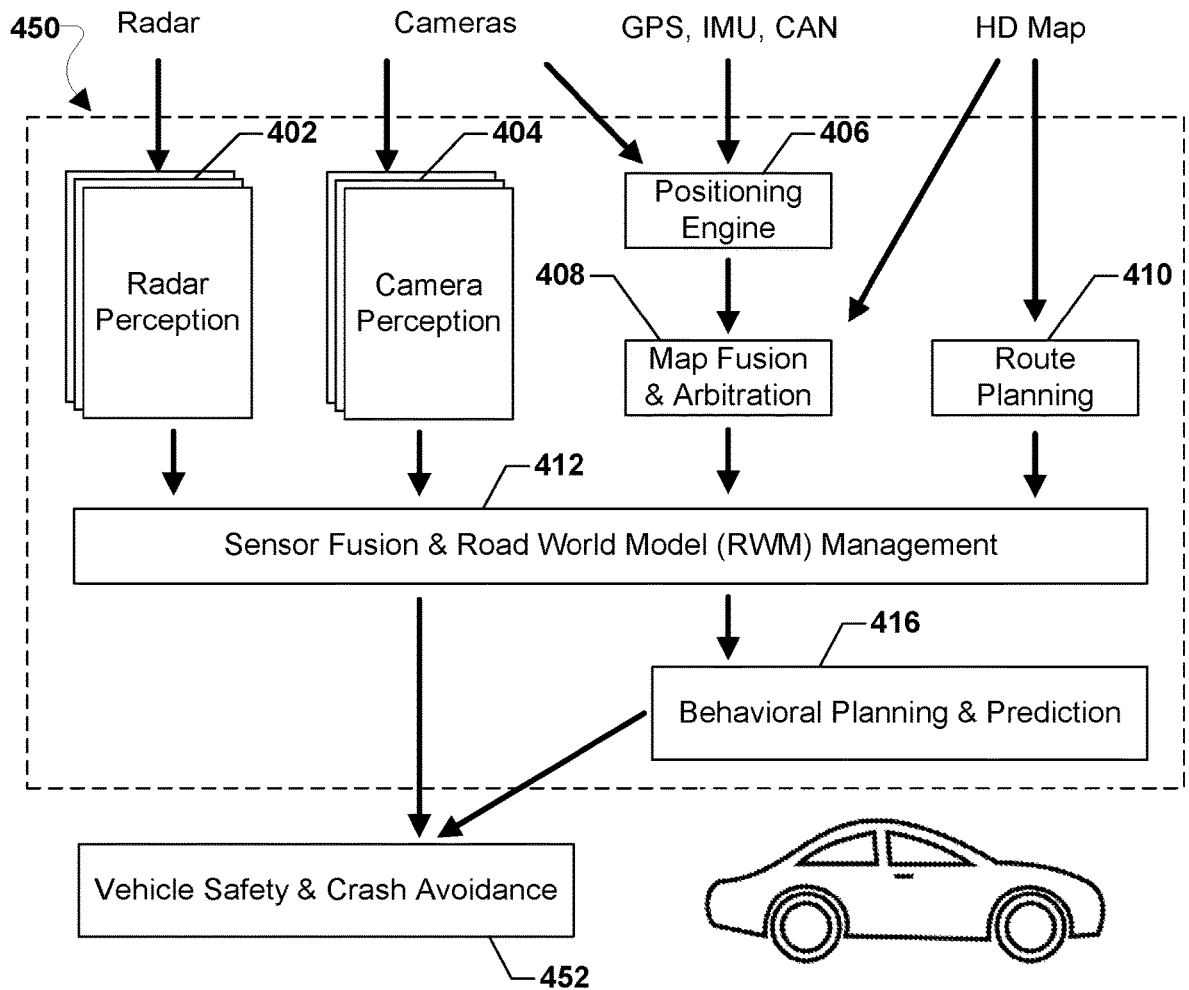
FIG. 4B is a component block diagram illustrating components of another example vehicle management system according to various embodiments.

FIG. 4B illustrates an example of subsystems, computational elements, computing devices or units within a vehicle management system 450, which may be utilized within a vehicle (e.g., 100). With reference to FIGS. 1A-4B, in some embodiments, the layers 402, 404, 406, 408, 410, 412, and 416 of the vehicle management system 400 may be similar to those described with reference to FIG. 4A. The vehicle management system 450 may operate similar to the vehicle management system 400, except that the vehicle management system 450 may pass various data or instructions to a vehicle safety and crash avoidance system 452 rather than the DBW system/control unit 420. For example, the configuration of the vehicle management system 450 and the vehicle safety and crash avoidance system 452 illustrated in FIG. 4B may be used in a non-autonomous, semi-autonomous, or fully autonomous vehicle. In addition, the functions of the vehicle management system 450 and/or the vehicle safety and crash avoidance system 452 may be reduced or disabled (e.g., turned off).

In various embodiments, the behavioral planning and prediction layer 416 and/or sensor fusion and RWM management layer 412 may output data to the vehicle safety and crash avoidance system 452. For example, the sensor fusion and RWM management layer 412 may output sensor data as part of refined location and state information of the vehicle 100 provided to the vehicle safety and crash avoidance system 452. The vehicle safety and crash avoidance system 452 may use the refined location and state information of the vehicle 100 to make safety determinations relative to the vehicle 100 and/or occupants of the vehicle 100. As another example, the behavioral planning and prediction layer 416 may output behavior models and/or predictions related to the motion of other vehicles to the vehicle safety and crash avoidance system 452. The vehicle safety and crash avoidance system 452 may use the behavior models and/or predictions related to the motion of other vehicles to make safety determinations relative to the vehicle 100 and/or occupants (e.g., 11, 12, 13) of the vehicle 100.

In various embodiments, the vehicle safety and crash avoidance system 452 may include functionality that performs safety checks or oversight of various commands, planning, or other decisions of various layers, as well as human driver actions and/or vehicle-control gestures, that could impact vehicle and occupant safety. In some embodiments, a variety of safety parameters may be stored in memory and the vehicle safety and crash avoidance system 452 may compare a determined value (e.g., relative spacing to a nearby vehicle, distance from the roadway centerline, etc.) to corresponding safety parameter(s), and issue a warning, command, or a safe alternative vehicle action, if the safety parameter is or will be violated.

For example, a vehicle safety and crash avoidance system 452 may determine the current or future separation distance between another vehicle (as defined by the sensor fusion and RWM management layer 412) and the vehicle (e.g., based on the road world model refined by the sensor fusion and RWM management layer 412), compare that separation distance to a safe separation distance parameter stored in memory, and issue instructions and/or propose a safe alternative vehicle action to a driver for speeding up, slowing down, or turning if the current or predicted separation distance violates the safe separation distance parameter. As another example, a vehicle safety and crash avoidance system 452 may compare a determined first vehicle action (e.g., by applying a first passenger profile to a detected first vehicle-control gesture performed by a first passenger) to a safe vehicle action limit or parameter, and issue an override command and/or alarm in response to the proposed vehicle action exceeding the safe vehicle action limit or parameter.

Figure 5:
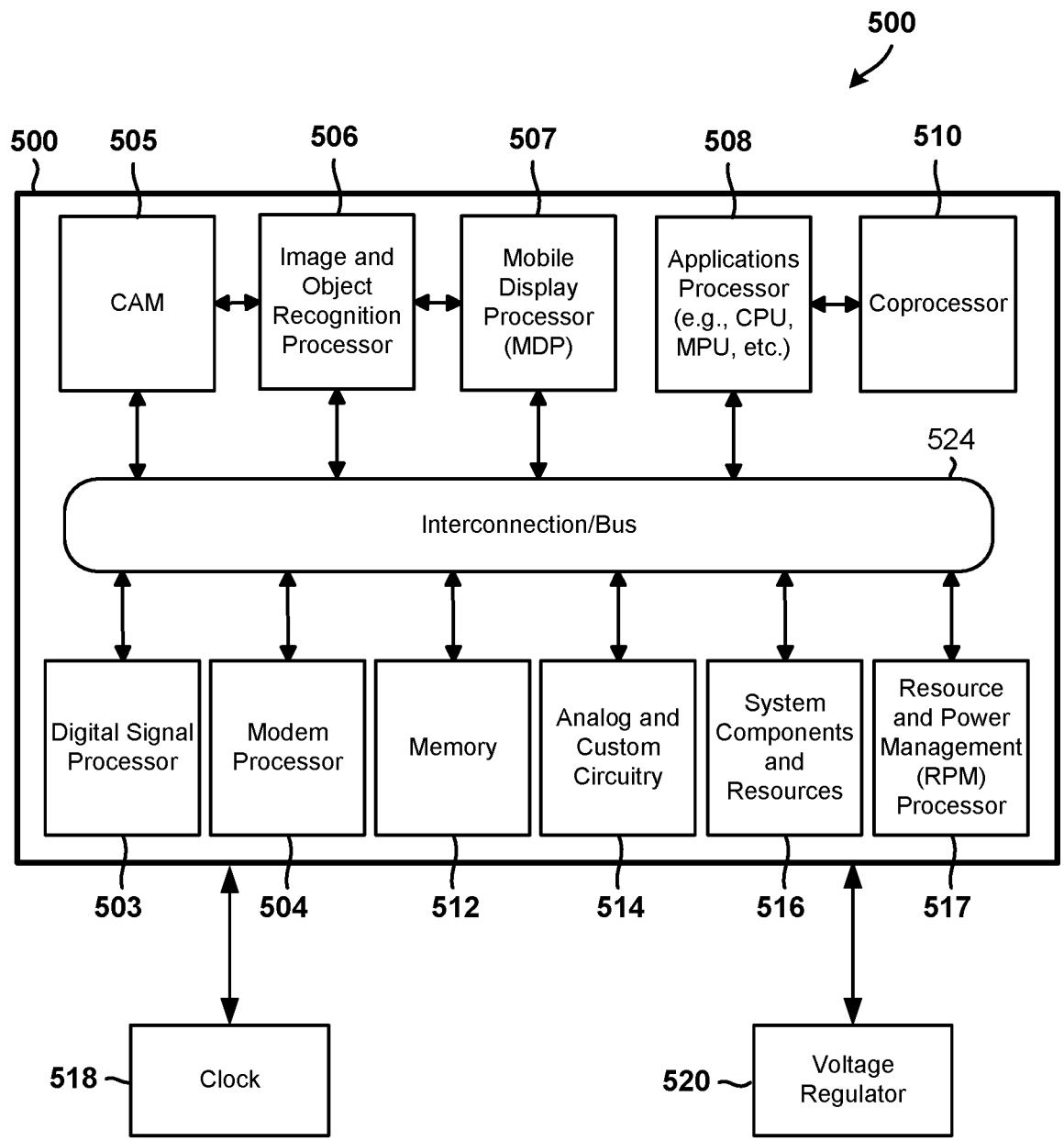
FIG. 5 is a block diagram illustrating components of an example system on chip for use in a vehicle that may be configured to operate based on vehicle-control gestures by a passenger in accordance with various embodiments.

FIG. 5 illustrates an example system-on-chip (SOC) architecture of a processing device SOC 500 suitable for implementing various embodiments in vehicles. With reference to FIGS. 1A-5, the processing device SOC 500 may include a number of heterogeneous processors, such as a digital signal processor (DSP) 503, a modem processor 504, an image and object recognition processor 506, a mobile display processor 507, an applications processor 508, and a resource and power management (RPM) processor 517. The processing device SOC 500 may also include one or more coprocessors 510 (e.g., vector co-processor) connected to one or more of the heterogeneous processors 503, 504, 506, 507, 508, 517. Each of the processors may include one or more cores, and an independent/internal clock. Each processor/core may perform operations independent of the other processors/cores. For example, the processing device SOC 500 may include a processor that executes a first type of operating system (e.g., FreeBSD, LINUX, OS X, etc.) and a processor that executes a second type of operating system (e.g., Microsoft Windows). In some embodiments, the applications processor 508 may be the SOC's 500 main processor, central processing unit (CPU), microprocessor unit (MPU), arithmetic logic unit (ALU), graphics processing unit (GPU), etc.

The processing device SOC 500 may include analog circuitry and custom circuitry 514 for managing sensor data, analog-to-digital conversions, wireless data transmissions, and for performing other specialized operations, such as processing encoded audio and video signals for rendering in a web browser. The processing device SOC 500 may further include system components and resources 516, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 500 also include specialized circuitry for camera actuation and management (CAM) 505 that includes, provides, controls and/or manages the operations of one or more cameras (e.g., 101, 112, 114; a primary camera, webcam, 3D camera, etc.), the video display data from camera firmware, image processing, video preprocessing, video front-end (VFE), in-line JPEG, high definition video codec, etc. The CAM 505 may be an independent processing unit and/or include an independent or internal clock.

In some embodiments, the image and object recognition processor 506 may be configured with processor-executable instructions and/or specialized hardware configured to perform image processing and object recognition analyses involved in various embodiments. For example, the image and object recognition processor 506 may be configured to perform the operations of processing images received from cameras (e.g., 136) via the CAM 505 to recognize and/or identify vehicle-control gestures, other vehicles, and otherwise perform functions of the camera perception layer 404 as described. In some embodiments, the processor 506 may be configured to process radar or lidar data and perform functions of the radar perception layer 402 as described.

The system components and resources 516, analog and custom circuitry 514, and/or CAM 505 may include circuitry to interface with peripheral devices, such as cameras 136, radar 122, lidar 124, electronic displays, wireless communication devices, external memory chips, etc. The processors 503, 504, 506, 507, 508 may be interconnected to one or more memory elements 512, system components and resources 516, analog and custom circuitry 514, CAM 505, and RPM processor 517 via an interconnection/bus module 524, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 500 may further include an input/output module (not illustrated) for communicating with resources external to the SOC, such as a clock 518 and a voltage regulator 520. Resources external to the SOC (e.g., clock 518, voltage regulator 520) may be shared by two or more of the internal SOC processors/cores (e.g., the DSP 503, the modem processor 504, the image and object recognition processor 506, the MDP, the applications processor 508, etc.).

In some embodiments, the processing device SOC 500 may be included in a control unit (e.g., 140) for use in a vehicle (e.g., 100). The control unit may include communication links for communication with a communication network (e.g., 180), the Internet, and/or a network server (e.g., 184) as described.

The processing device SOC 500 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 6:
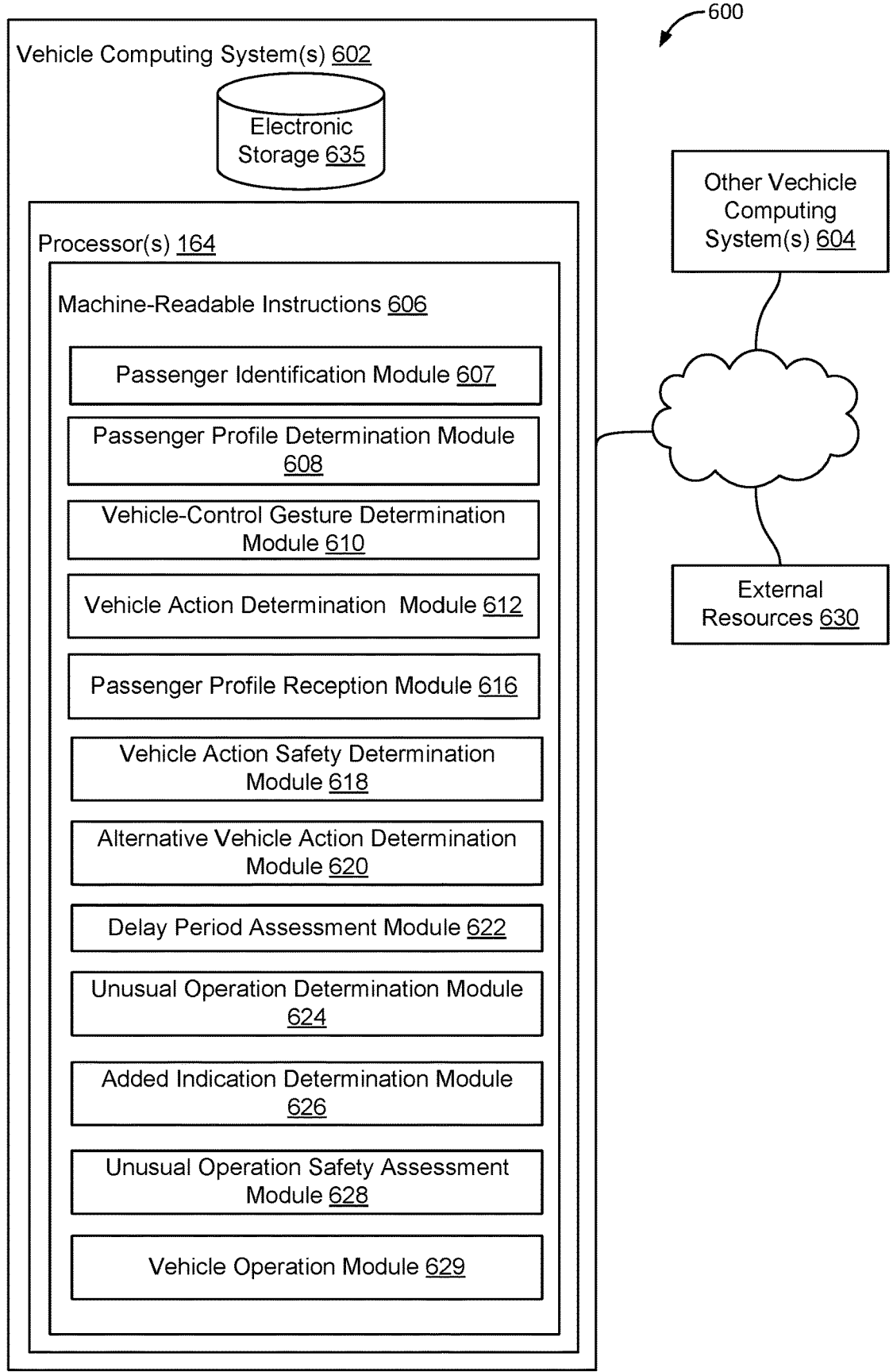
FIG. 6 is a component block diagram of an example vehicle computing system configured for operating the vehicle based on vehicle-control gestures by a passenger according to various embodiments.

FIG. 6 shows a component block diagram illustrating a system 600 configured for collaboratively operating a vehicle (e.g., 100) based on vehicle-control gestures by a passenger in accordance with various embodiments. In some embodiments, the system 600 may include one or more vehicle computing systems 602 and one or more other vehicle computing system other vehicle computing systems 604 communicating via a wireless network. With reference to FIGS. 1A-6, the vehicle computing system(s) 602 may include a processor (e.g., 164), a processing device (e.g., 500), and/or a control unit (e.g., 140) (variously referred to as a "processor") of a vehicle (e.g., 100). The other vehicle computing system(s) 604 may include a processor (e.g., 164), a processing device (e.g., 500), and/or a control unit (e.g., 140) (variously referred to as a "processor") of a vehicle (e.g., 100).

The vehicle computing system(s) 602 may be configured by machine-executable instructions 606. Machine-executable instructions 606 may include one or more instruction modules. The instruction modules may include computer program modules. The instruction modules may include (but is not limited to) one or more of a passenger identification module 607, passenger profile determination module 608, vehicle-control gesture determination module 610, vehicle action determination module 612, passenger profile reception module 616, vehicle action safety determination module 618, alternative vehicle action determination module 620, delay period assessment module 622, unusual operation determination module 624, added indication determination module 626, unusual operation safety assessment module 628, vehicle operation module 629, and/or other instruction modules.

The passenger identification module 607 may be configured to identify a passenger (i.e., one or more occupants of the vehicle). In some embodiments, the passenger identification module 607 may be configured to identify a passenger based on (but not limited to) at least one of a position of the passenger in the vehicle, an input by the passenger, or recognition of the passenger. For instance, the input by the passenger and/or the recognition of the passenger may be determined from occupants through their portable computing device (e.g., a smartphone) or from identification using sensors (e.g., 101), such as (but not limited to) using biosensor(s), and/or facial recognition systems. By way of non-limiting example, a processor (e.g., 164) of a processing device (e.g., 500) may use the electronic storage 635, other vehicle computing system(s) 604, external resources 630, one or more sensor(s) (e.g., 101), and a profile database (e.g., 142) to identify passengers or location in which passengers are seated.

The passenger profile determination module 608 may be configured to determine one or more profiles that should be applied to recognized gestures performed by a passenger. The determination of the appropriate passenger profile will more effectively normalize passenger gestures for translation to an executable vehicle action. By way of non-limiting example, a processor (e.g., 164) of a processing device (e.g., 500) may use the electronic storage 635, a profile database (e.g., 142), and passenger identification information to determine which passenger profile to use based on current conditions. The profile database and/or the passenger profile determination module 608 may maintain a plurality of passenger profiles that include a passenger profile for designated individuals. Some or all of the plurality of passenger profiles may normalize vehicle-control gestures differently as individuals may making a given control gesture may move their fingers, hands and/or arms with different speeds, through different angles and with differences in motions. Thus, a second may normalize vehicle-control gestures differently than a first passenger profile. Some implementations may not employ the passenger profile determination module 608 and more directly apply a predetermined passenger profile. Alternatively, the use of the passenger profile determination module 608 may be selectively turned on or off as needed or desired, which may be decided manually or automatically based on circumstances/conditions.

According to various embodiments, in circumstances in which more than one passenger occupies the vehicle, the passenger profile determination module 608 may also be configured to determine one or more passengers considered to be designated as the driver(s), thus accepting vehicle-control gestures only from the designated driver(s). In this way, the passenger profile determination module 608 may ignore gestures from one or more passengers not designed to be the driver(s). In further embodiments, if more than one driver is designated as a driver (e.g., in a student driver situation or a driver education application), the passenger profile determination module 608 may have a way of determining a hierarchy between them, in case conflicting vehicle-control gestures are detected. Using sensors (e.g., 101) the passenger profile determination module 608 may determine that the vehicle has multiple occupants and also determine who or which occupant(s) is/are in charge (i.e., the designated driver(s)). In some embodiments, a passenger occupying what is traditionally the driver's seat (or other pre-set location of the vehicle) may be selected as the designated driver by default, unless an override is received. Alternatively, both front seat occupants may be designated drivers (since they tend to have a good view of the roadway). In particular embodiments, in such cases, vehicle-control gestures from the driver's seat passenger may override vehicle-control gestures from the other front seat passenger.

In some embodiments, the designated driver may be chosen after an input from the occupants (e.g., from an associated mobile device or a direct input into the vehicle). In some embodiments, the input about the designated driver may also be received automatically from occupants, such as through the passenger identification module 607. In some embodiments, when determining the designated driver through identification, the passenger profile determination module 608 may automatically apply a hierarchy. For example, the owner, most common, or most recent designated driver may have top priority as the designated driver. Similarly, a hierarchical list may be programmed or user-defined (e.g., (e.g., dad>mom>oldest child, or dad and mom>oldest child). In other embodiments, there may be no hierarchy, with vehicle-control gestures accepted from all or some occupants.

In some implementations in which there is a designated driver or hierarchy for receiving commands among occupants, the non-designated drivers or lower hierarchy occupants may be allowed to input select vehicle-control gestures, such as but not limited to non-navigational commands and/or commands that do not risk the safety of the vehicle or occupants (e.g., controlling cabin temperature, entertainment system volume). Alternatively, vehicle-control gestures from the non-designated drivers or lower hierarchy occupants may be accepted, but with higher safety parameters employed (e.g., greater distance required between vehicles, lower maximum speed, etc.) or lower magnitudes in the vehicle's inputs (e.g., limiting to only single-lane changes, increasing/decreasing speed to only 5-mph increments, etc.). For example, the vehicle-control gesture determination module 610 may recognize gestures from a "back seat driver" limited to reducing the speed of the vehicle or increasing vehicle separation distances, as such commands would be safe and may make such occupants feel safer, but all other vehicle maneuver controls may not be recognized. Thus, the non-designated drivers or lower hierarchy occupants may be allowed a less extend of control as compared to the designated driver or higher priority designated driver.

In some embodiments, limits on the recognized gestures of non-designated drivers or lower hierarchy occupants may be overridden in some circumstances. In some embodiments, the vehicle-control gesture determination module 610 may recognize an override gesture or circumstances in which gestures by a non-designated driver should be recognized and implemented, such as to accommodate circumstances in which the designated driver becomes incapacitated. For example, if the vehicle-control gesture determination module 610 detects that the designated driver has fallen asleep or is slumped over (apparently passed out) and another passenger is making recognized vehicle control gestures, the vehicle may implement such gestures.

In some embodiments, priority among designated drivers or a selection of a new designated driver may occur in response to a trigger event, such as automatically. One non-limiting example of such a trigger event may be detection of a change in behavior of the current designated driver (or designated driver with highest priority) one or more sensors and/or by the vehicle control system, such as due to fatigue, distraction, inebriation, and/or the like. For example, a camera system tracking the designated driver's eyes may detect eyelid droop from fatigue, that the driver is not watching the road due to distraction, or the designated driver's eyes are moving slowly due to inebriation. Another non-limiting example of such a trigger event may be detection of a command (e.g., verbal command or command gesture) by the current designated driver (or designated driver with highest priority), other occupant, or a remote party (e.g., owner of the vehicle) received by a wireless communication link. Thus, the passenger profile determination module 608 may be configured to assess and determine (e.g., automatically) whether the current designated driver or other passenger providing vehicle-control gestures is exhibiting a change in behavior that may impair that individual's ability to give proper or timely vehicle-control gestures. The passenger profile determination module 608 may receive inputs from sensors (e.g., 101), such as cameras, alcohol sensors, motion detectors, or the like and apply passenger motion pattern recognition to determine a level of impairment of a passenger. In response to the passenger profile determination module 608 detecting that a designated driver (or designated driver with highest priority) is impaired, the passenger profile determination module 608 may be configured to select a new designated driver or change a priority of designated drivers.

In some embodiments, in response to the passenger profile determination module 608 detecting that a designated driver (or designated driver with highest priority) is impaired, that impaired designated driver may still be give some degree of control. For example, the impaired designated driver may be restricted to only providing non-navigational commands and/or commands that do not risk the safety of the vehicle or occupants (e.g., controlling cabin temperature, entertainment system volume). Alternatively, the impaired designated driver may be limited to fewer vehicular controls or a lesser degree of vehicle control (e.g., limiting to speed, changes in speed, number of lanes that may be changed in one continuous maneuver, etc.). Additionally or alternatively, the impaired designated driver may be allowed to provide navigational commands and/or controls, but only if they satisfy a safety threshold, which may be higher than the safety threshold used for drivers not considered impaired. For example, an impaired designated driver may be allowed to make a two-lane lane change on an empty highway, but not allowed to direct the same maneuver on a crowded highway.

The vehicle-control gesture determination module 610 may be configured to determine when a passenger (e.g., 11, 12, 13) performs a vehicle-control gesture in such a way that is recognizable to a vehicle gesture detection system (e.g., 50). By way of non-limiting example, a processor (e.g., 164) of a processing device (e.g., 500) may use the electronic storage 635, one or more sensor(s) (e.g., 101), and a gesture recognition engine (e.g., 144) to determine whether one or more passengers has/have performed a vehicle-control gesture for operating the vehicle (e.g., 100). Once the vehicle-control gesture determination module 608 detects that a passenger has performed one or more vehicle-control gestures, information about the one or more vehicle-control gestures may be passed along to a control unit (e.g., 140).

The vehicle action determination module 612 may be configured to determine which vehicle action or actions is/are associated with detected vehicle-control gestures. The vehicle action determination module 612 may also be configured to determine alternative vehicle actions, when detected vehicle-control gestures are associated with actions that are not safe to the vehicle and/or passengers, or unusual in some way. By way of non-limiting example, the vehicle action determination module 612 may use a processor (e.g., 164) of a processing device (e.g., 500), the electronic storage 635, and a vehicle management system (e.g., 400, 450) to determine vehicle actions.

The passenger profile reception module 616 may be configured to receive and store passenger profiles. The passenger profile reception module 616 may receive passenger profiles that are customized to a passenger from training inputs. Additionally, or alternatively, the passenger profile reception module 616 may receive passenger profiles as input data through a vehicle user interface or from another computing device providing such data. For example, a passenger may follow a training protocol, where the passenger practices and/or performs gestures and passenger movements are recorded and analyzed to generate a passenger profile for that passenger. As a further example, a remote computing device may provide one or more passenger profiles to the passenger profile reception module 616 for application to vehicle-control gestures. By way of non-limiting example, a processor (e.g., 164) of a processing device (e.g., 500) may use the electronic storage 635, one or more sensor(s) (e.g., 101), and input devices for receiving passenger profiles.

The vehicle action safety determination module 618 may be configured to determine whether the first vehicle action associated with the detected first vehicle-control gesture is safe for the vehicle to execute. The determination of safety may ensure no damage or injury to the vehicle or the passengers. Typically, what is safe for the vehicle is also safe for the passengers and vice-versa (i.e., a level of risk to vehicle safety is equal to or approximate to a level of risk to passenger safety), but perhaps not always. For example, an extremely rapid deceleration may cause whiplash to a passenger, while the vehicle may sustain no damage. Thus, what is safe will generally prioritize the safety of the passenger(s). By way of non-limiting example, a processor (e.g., 164) of a processing device (e.g., 500) may use the electronic storage 635, and a vehicle management system (e.g., 400, 450) to determine or assess the safety of various vehicle actions.

In some implementations, the alternative vehicle action determination module 620 may be configured to determine one or more alternative vehicle actions (e.g., changing speed(s), changing to a different lane(s), etc.) that may be a safer alternative to a first vehicle action associated with a received vehicle-control gesture. The alternative vehicle action determination module 620 may be used in response to determining that a first vehicle action is not safe for the vehicle to execute. In another embodiment, the determined alternative vehicle actions may have a determined lower probability of resulting in damage to the vehicle and/or passengers, by at least some threshold amount, as compared to the first vehicle action. For example, a first vehicle action may involve changing lanes to a lane such that the vehicle will be traveling behind another vehicle. That first vehicle action may be relatively safe, but there may be a statistical chance (i.e., relatively small) that the vehicle in the lead could slam on its brakes soon after the lane change (i.e., a first level of risk to safety). Meanwhile, an alternative vehicle action may include first overtaking that vehicle in the lead before changing lanes, which may be associated with a lower statistical chance of the vehicle becoming involved in an accident because of the open road ahead of that lead vehicle (i.e., a second level of risk to safety, which is lower than the first level of risk to safety). By way of non-limiting example, a processor (e.g., 164) of a processing device (e.g., 500) may use the electronic storage 635, and a vehicle management system (e.g., 400, 450) to determine alternative vehicle actions.

The delay period assessment module 622 may be configured to determine whether a reasonable delay period may make an otherwise unsafe vehicle action safe enough for a vehicle to execute. For example, a first vehicle-control gesture may direct the vehicle to make a lane change that is unsafe due to another vehicle traveling in close proximity within that lane. The delay period assessment module 622 may determine that, because the other vehicle is traveling at a different speed, a delay of up to five (5) seconds before initiating the lane change may change that otherwise unsafe maneuver into a safe one. In further embodiments, at the end of the delay period if the move is still unsafe, the delay period assessment module 622 may re-determine whether an additional delay period may make the otherwise unsafe vehicle action safe enough for the vehicle to execute. Alternatively, the vehicle may notify the user (driver) of the determination not to perform the move and/or to ask for further input from the user.

In various embodiments, a maximum delay threshold, such as (but not limited to) 5-10 seconds, may be used to limit the duration of delay periods that may be considered by the delay period assessment module 622. The maximum delay threshold may be set and/or changed by a passenger, vehicle owner, and/or manufacturer. In addition, the maximum delay threshold may be different for each passenger (i.e., associated with a passenger profile). Alternatively, the maximum delay threshold may be universal for all passengers. As a further alternative, while individual passengers may have different maximum delay thresholds, the vehicle may also have an ultimate maximum delay threshold that the individual maximum delay thresholds may not exceed. By way of non-limiting example, a processor (e.g., 164) of a processing device (e.g., 500) may use the electronic storage 635, and a vehicle management system (e.g., 400, 450) to determine or assess delay periods for executing various vehicle actions.

The unusual operation determination module 624 may be configured to determine whether a vehicle action associated with a vehicle-control gesture includes an unusual vehicle operation. Unusual operations may include vehicle operations that are not habitually or commonly performed by the vehicle (e.g., compared to the same vehicle's operations in the past, other vehicles or similar vehicles, vehicles under similar circumstances (e.g., location, time of day/year, weather conditions, etc.), such as a sudden action or actions that are significantly more extreme than actions typically performed by the vehicle. Whether a vehicle action is considered unusual may depend on whether that vehicle action has been performed before, as well as the speed, acceleration/deceleration, degree, and extend of the vehicle action. In the case of vehicle actions that have been performed before, but just not at the same speed, degree, and/or extent, the processor may use a threshold that once exceeded makes that vehicle action unusual.

In addition, whether a vehicle action is considered unusual may depend on the current circumstances. For example, a single-lane change to the right on the highway may not be unusual from a center lane, but from the right-hand land (i.e., directing the vehicle onto a shoulder of the highway) may be evaluated by the unusual operation determination module 624 as unusual. Similarly, other circumstances, such as (but not limited to) location, weather conditions, time of day/year, lighting, etc., may be considered by the unusual operation determination module 624.

The determination, by the unusual operation determination module 624, may be based on historical records from a passenger profile and/or a knowledge base of usual/unusual vehicle actions under specified conditions (i.e., expected norms). In some cases, the determination, by the unusual operation determination module 624, that a vehicle action associated with a vehicle-control gesture is an unusual operation may be indicative of a false input. False inputs may result from, for example, a passenger gesture that was not performed correctly or was not intended to be a vehicle-control gesture (e.g., such as a gesticulation, or sneeze). Similarly, a passenger that is under the influence of a controlled substance or distracted may perform vehicle-control gestures incorrectly, inappropriately, and/or inadvertently. A determination that a vehicle-control gesture is unusual (i.e., a false input or otherwise) may be conveyed to the vehicle action determination module 612, when assessing whether to follow that vehicle-control gesture or whether to determine an alternative vehicle action. By way of non-limiting example, a processor (e.g., 164) of a processing device (e.g., 500) may use the electronic storage 635, and a vehicle management system (e.g., 400, 450) to determine or assess whether vehicle actions are considered unusual.

In various embodiments, the added indication determination module 626 may be configured to detect whether a passenger has performed an added indication in conjunction with an unusual operation. In some embodiments, the added indication may have been performed by the passenger together with the vehicle-control gesture associated with the unusual operation (e.g., before, during or after the unusual operation). The added indication may be performed within some window of the unusual operation (e.g., within 2-3 seconds before/after the unusual operation). In some embodiments, the added indication may be performed in response to a prompt associated with the unusual operation (e.g., the vehicle notifies the driver of the unusual operation requesting confirmation or clarification).

The added indication may suggest that a passenger, who has performed an unusual vehicle-control gesture, truly intended to execute the unusual operation. For example, the added indication may include at least one of an exaggerated gesture, a repeated gesture, a gesture performed more quickly than usual, or a non-visual input (e.g., audio) received in conjunction with (e.g., contemporaneously) with the detected vehicle-control gesture.

In some embodiments, in response to the unusual operation determination module 624 determining that a received vehicle-control gesture is unusual, the system may prompt the passenger for confirmation or clarification, and the response (e.g., gesture of audio command) by the user, which is received as an added indication, may confirm or clarify the vehicle-control gesture. The prompt to the passenger may be simple (e.g., a chime or short series of tones) or may include more detailed feedback (e.g., verbal feedback) that informs the passenger that an added indication is needed. Verbal feedback or distinct tonal sequences may thus inform the passenger that the received vehicle-control gesture will result in an unusual vehicle operation and thus confirmation is needed. By way of non-limiting example, a processor (e.g., 164) of a processing device (e.g., 500) may use the electronic storage 635, one or more sensor(s) (e.g., 101), and a gesture recognition engine (e.g., 144) to determine whether a passenger has performed an added indication associated with a vehicle-control gesture.

In some embodiments, even when the user confirms the unusual operation is intended, the vehicle operation module 629 may operate the vehicle to implement a less extreme version of the unusual operation (e.g., if implementing the unusual operation exceeds a safety threshold). The less extreme version of the unusual operation may involve a lesser degree of a maneuver (e.g., a single-lane change instead of a double or triple-lane change; increasing speed by 5 mph instead of 25 mph, etc.). In some embodiments, if the unusual operation is too extreme (i.e., exceeds a safety threshold), the unusual operation may be ignored and the passenger informed that the unusual operation is unsafe. For example, the vehicle control system may verbally explain that the unusual operation is being ignored.

The unusual operation safety assessment module 628 may be configured to determine whether any unusual vehicle operation detected by the unusual operation determination module 624 is safe for the vehicle or occupants. By way of non-limiting example, a processor (e.g., 164) of a processing device (e.g., 500) may use the electronic storage 635, and a vehicle management system (e.g., 400, 450) to determine or assess whether vehicle actions are considered unusual.

The vehicle operation module 629 may be configured to operate the vehicle to implement vehicle actions, such as in response to determining that a particular vehicle action is safe for the vehicle and occupants. The vehicle operation module 629 may also operate the vehicle to implement alternative and/or other vehicle actions as needed. For example, the vehicle operation module 629 may operate the vehicle to implement a second vehicle action in response to determining that the second vehicle action is available.

Similarly, the vehicle operation module 629 may operate the vehicle to implement the first vehicle action after a determined delay period in response to determining that the first vehicle action associated with a detected first vehicle-control gesture is safe for the vehicle to execute after the determined delay period. Further, the vehicle operation module 629 may operate the vehicle to implement a second vehicle action that is a safer alternative to the first vehicle action in response to determining that the unusual vehicle operation is not safe (i.e., unsafe) for the vehicle or occupants. In this way, the vehicle operation module 629 may implement the alternative vehicle action determined by the alternative vehicle action determination module 620. By way of non-limiting example, the vehicle operation module 629 may use a processor (e.g., 164) of a processing device (e.g., 500), the electronic storage 635, and a vehicle management system (e.g., 400, 450) to operate the vehicle (e.g., execute vehicle actions).

In accordance with various embodiment, the vehicle operation module 629 may implement the vehicle actions autonomously. Thus, although the implemented vehicle actions result from passenger input (i.e., from a received vehicle-control gesture), the vehicle operation module 629 may perform the necessary functions to operation the vehicle safely without the vehicle coming out of an autonomous mode. Under some circumstances, the vehicle operation module 629 may implement one or more alternative vehicle action(s) determined to be safer than the vehicle action(s) more strictly associated with one or more received vehicle-control gesture(s).

In some embodiments, vehicle computing system(s) 602, other vehicle computing system(s) 604 may communicate with one another via a wireless network (e.g., 180), such as V2V wireless communication links. Additionally, the vehicle computing system(s) 602 and other vehicle computing system(s) 604 may be connected to wireless communication networks that provide access to external resources 630. For example, such electronic communication links may be established, at least in part, via a network such as the Internet and/or other networks. It will be appreciated that this is not intended to be limiting, and that the scope of this disclosure includes embodiments in which vehicle computing system(s) 602, other vehicle computing system(s) 604, and/or external resources 630 may be operatively linked via some other communication media.

The other vehicle computing system 604 may also include one or more processors configured to execute computer program modules configured by machine-executable instructions 606. Machine-executable instructions 606 may include one or more instruction modules that may include one or more of the passenger profile determination module 608, vehicle-control gesture determination module 610, vehicle action determination module 612, passenger identification module 607, passenger profile reception module 616, vehicle action safety determination module 618, alternative vehicle action determination module 620, delay period assessment module 622, unusual operation determination module 624, added indication determination module 626, unusual operation safety assessment module 628, vehicle operation module 629, and/or other instruction modules similar to the vehicle computing system 602 of a first vehicle as described.

External resources 630 may include sources of information outside of system 600, external entities participating with the system 600, and/or other resources. For example, external resources 630 may include map data resources, highway information (e.g., traffic, construction, etc.) systems, weather forecast services, etc. In some embodiments, some or all of the functionality attributed herein to external resources 630 may be provided by resources included in system 600.

Vehicle computing system(s) 602 may include electronic storage 635, one or more processors 164, and/or other components. Vehicle computing system(s) 602 may include communication lines, or ports to enable the exchange of information with a network and/or other vehicle computing system. Illustration of vehicle computing system(s) 602 in FIG. 6 is not intended to be limiting. Vehicle computing system(s) 602 may include a plurality of hardware, software, and/or firmware components operating together to provide the functionality attributed herein to vehicle computing system(s) 602. For example, vehicle computing system(s) 602 may be implemented by a cloud of vehicle computing systems operating together as vehicle computing system(s) 602.

Electronic storage 635 may comprise non-transitory storage media that electronically stores information. The electronic storage media of electronic storage 635 may include one or both of system storage that is provided integrally (i.e., substantially non-removable) with vehicle computing system(s) 602 and/or removable storage that is removably connectable to vehicle computing system(s) 602 via, for example, a port (e.g., a universal serial bus (USB) port, a firewire port, etc.) or a drive (e.g., a disk drive, etc.). Electronic storage 635 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 635 may store software algorithms, information determined by processor(s) 164, information received from vehicle computing system(s) 602, information received from other vehicle computing system(s) 604, and/or other information that enables vehicle computing system(s) 602 to function as described herein.

Processor(s) 164 may be configured to provide information processing capabilities in vehicle computing system(s) 602. As such, processor(s) 164 may include one or more of a digital processor, an analog processor, a digital circuit designed to process information, an analog circuit designed to process information, a state machine, and/or other mechanisms for electronically processing information. Although processor(s) 164 is shown in FIG. 6 as a single entity, this is for illustrative purposes only. In some embodiments, processor(s) 164 may include a plurality of processing units. These processing units may be physically located within the same device, or processor(s) 164 may represent processing functionality of a plurality of devices operating in coordination. Processor(s) 164 may be configured to execute modules 608, 607, 610, 612, 616, 618, 620, 622, 624, 626, 628, and/or 629, and/or other modules. Processor(s) 164 may be configured to execute modules 608, 607, 610, 612, 616, 618, 620, 622, 624, 626, 628, and/or 629, and/or other modules by software; hardware; firmware; some combination of software, hardware, and/or firmware; and/or other mechanisms for configuring processing capabilities on processor(s) 164. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 607, 610, 612, 616, 618, 620, 622, 624, 626, 628, and/or 629 are illustrated in FIG. 6 as being implemented within a single processing unit, in embodiments in which processor(s) 164 includes multiple processing units, one or more of modules 608, 607, 610, 612, 616, 618, 620, 622, 624, 626, 628, and/or 629 may be implemented remotely from the other modules. The description of the functionality provided by the different modules 608, 607, 610, 612, 616, 618, 620, 622, 624, 626, 628, and/or 629 described below is for illustrative purposes, and is not intended to be limiting, as any of modules 608, 607, 610, 612, 616, 618, 620, 622, 624, 626, 628, and/or 629 may provide more or less functionality than is described. For example, one or more of modules 608, 607, 610, 612, 616, 618, 620, 622, 624, 626, 628, and/or 629 may be eliminated, and some or all of its functionality may be provided by other ones of modules 608, 607, 610, 612, 616, 618, 620, 622, 624, 626, 628, and/or 629. As another example, processor(s) 164 may be configured to execute one or more additional modules that may perform some or all of the functionality attributed below to one of modules 608, 607, 610, 612, 616, 618, 620, 622, 624, 626, 628, and/or 629.

Figure 7A:
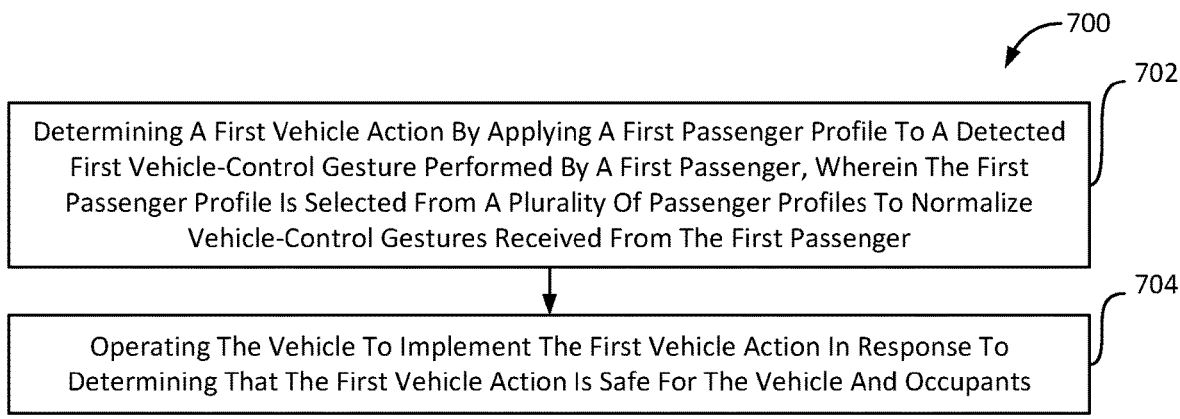
FIGS. 7A, 7B, and 7C illustrate examples of a vehicle operating based on vehicle-control gestures by a passenger in accordance with various embodiments.
Figure 7B:
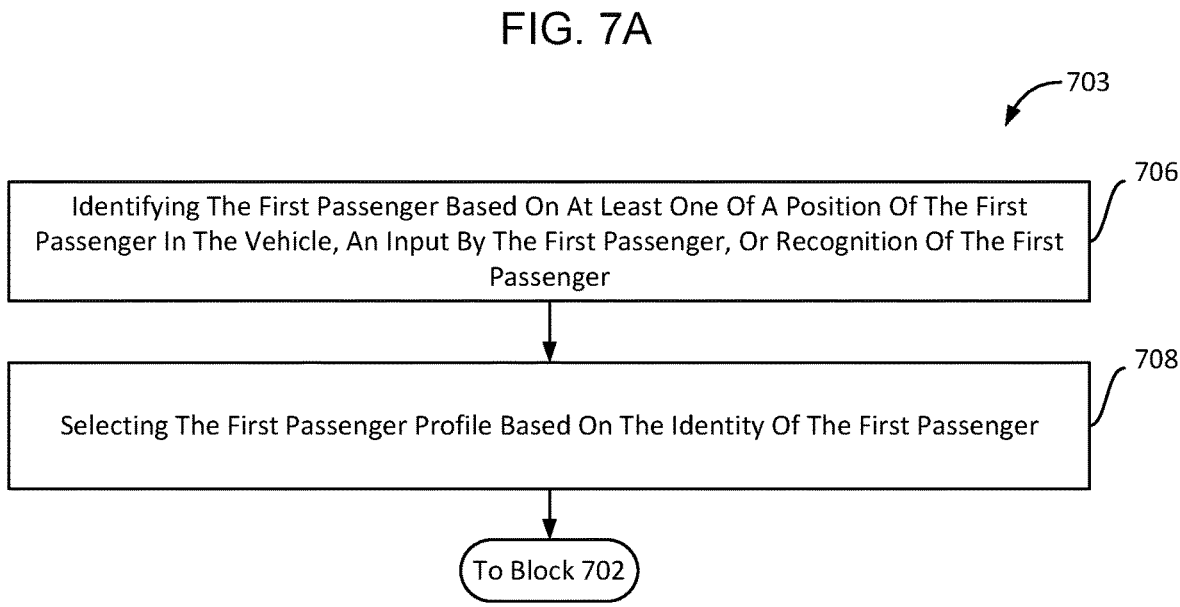

FIGS. 7A, 7B, and/or 7C illustrate operations of methods 700, 703, and 705, respectively, for operating a vehicle based on vehicle-control gestures by a passenger in accordance with various embodiments. With reference to FIGS. 1A-7C, the methods 700, 703, and 705 may be implemented in a processor (e.g., 164), a processing device (e.g., 500), and/or a control unit (e.g., 140) (variously referred to as a "processor") of a vehicle (e.g., 100). In some embodiments, the methods 700, 703, and 705 may be performed by one or more layers within a vehicle management system stack, such as a vehicle management system (e.g., 400, 450). In some embodiments, the methods 700, 703, and 705 may be performed by a processor independently from, but in conjunction with, a vehicle control system stack, such as the vehicle management system. For example, the methods 700, 703, and 705 may be implemented as a stand-alone software module or within dedicated hardware that monitors data and commands from/within the vehicle management system and is configured to take actions and store data as described.

FIG. 7A illustrates a method 700 for operating the vehicle based on vehicle-control gestures by a passenger in accordance with various embodiments.

In block 702, a vehicle processor may determine a first vehicle action by applying a first passenger profile to a detected first vehicle-control gesture performed by a first passenger. The first passenger profile may be selected from a plurality of passenger profiles to normalize vehicle-control gestures received from the first passenger. For example, the processor may detect a vehicle-control gesture in the form of a passenger holding an open palm forward (i.e., an indication to stop). After applying the passenger profile assigned to the current passenger, the processor may determine this gesture means the passenger wants the vehicle to come to a stop. In some embodiments, means for performing the operations of block 702 may include a processor (e.g., 164) coupled to one or more sensors (e.g., 101) and electronic storage (e.g., 635). To make the determination in block 702, the processor may use the vehicle action determination module (e.g., 612).

In block 704, the vehicle processor may operate the vehicle to implement the first vehicle action in response to determining that the first vehicle action is safe for the vehicle and occupants. For example, the processor may cause the vehicle to come to a stop. In some embodiments, means for performing the operations of block 704 may include a processor (e.g., 164) coupled to electronic storage (e.g., 635) and a vehicle management system (e.g., 400, 450). To make the determination in block 704, the processor may use the vehicle operation module (e.g., 629).

In some embodiments, the processor may repeat the operations in blocks 702 and 704 to periodically or continuously operate the vehicle based on vehicle-control gestures by a passenger.

FIG. 7B illustrates a method 703 for operating the vehicle based on vehicle-control gestures by a passenger in accordance with various embodiments.

In block 706, the processor of the first vehicle may identify the first passenger based on at least one of a position of the first passenger in the vehicle, an input by the first passenger, or recognition of the first passenger. For example, the processor may recognize the passenger as being seated in the front left seat, may receive a passenger profile or at least identification information from the passenger, or facial recognition software my recognize the passenger using onboard imaging. In some embodiments, means for performing the operations of block 706 may include a processor (e.g., 164) coupled to electronic storage (e.g., 635) and a passenger identification module (e.g., 607).

In block 708, the processor may select the first passenger profile based on the identity of the first passenger. For example, the processor may select a passenger profile unique to the current occupant, based on an identification card presented by the passenger when the vehicle was started. In some embodiments, means for performing the operations of block 708 may include a processor (e.g., 164) coupled to electronic storage (e.g., 635) and a passenger profile determination module (e.g., 608). Following the operations in block 708 in the method 703, the processor may execute the operations of block 702 of the method 700 as described.

In some embodiments, the processor may repeat any or all of the operations in blocks 706 and 708 to repeatedly or continuously select passenger profiles as needed.

Figure 7C:
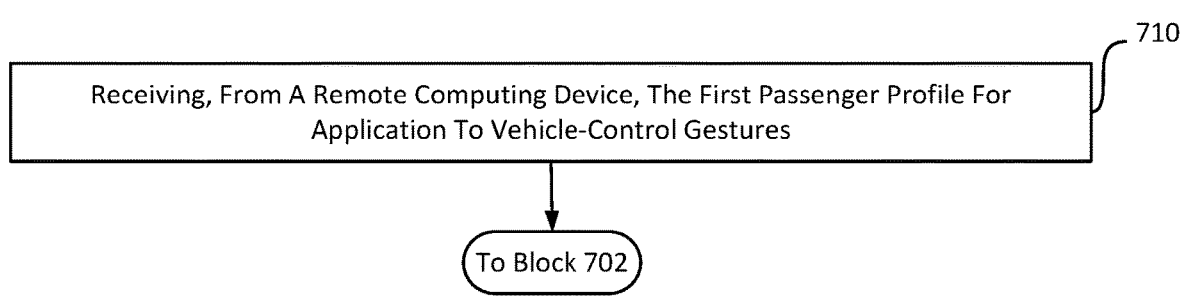

FIG. 7C illustrates method 705 for operating the vehicle based on vehicle-control gestures by a passenger in accordance with various embodiments.

In block 710, the processor may perform operations including receiving, from a remote computing device, the first passenger profile for application to vehicle-control gestures. For example, the processor may receive the first passenger profile as data received through a radio module (e.g., 172) or input module (e.g., 168). In some embodiments, means for performing the operations of block 710 may include a processor (e.g., 164) coupled to electronic storage (e.g., 635) and a passenger profile reception module (e.g., 616). Following the operations in block 710 in the method 705, the processor may execute the operations of block 702 of the method 700 as described.

In some embodiments, the processor may repeat the operation in block 710 to repeatedly or continuously receive passenger profiles or updates to passenger profiles.

Further embodiments include methods and devices that include determining whether a first vehicle action associated with a detected and recognized first vehicle-control gesture is safe for the vehicle to execute, determining whether a second vehicle action that is a safer alternative to the first vehicle action is available for the vehicle to execute in response to determining the first vehicle action is not safe for the vehicle to execute, and operating the vehicle to implement the second vehicle action in response to determining that the second vehicle action is available.

In some embodiments, a processor of the vehicle may determine whether the first vehicle action associated with the detected first vehicle-control gesture is safe for the vehicle to execute after a determined delay period. Also, the processor may operate the vehicle to implement the first vehicle action or an alternative second vehicle action after the determined delay period in response to determining that the first vehicle action or the alternative second vehicle action is safe for the vehicle to execute after the determined delay period.

In some embodiments, a processor of the vehicle may determine whether the first vehicle action includes an unusual vehicle operation. In some embodiments, the processor may determine whether the detected first vehicle-control gesture includes an added indication that the unusual vehicle operation is intended by the first passenger in response to determining that the first vehicle action includes the unusual vehicle operation, in which operating the vehicle to implement the first vehicle action is further in response to determining that the detected first vehicle-control gesture includes the added indication that the unusual vehicle operation is intended by the first passenger. In some embodiments, the added indication may include at least one of an exaggerated gesture, a repeated gesture, a gesture performed more quickly than usual, or a non-visual input (e.g., audio) received in conjunction with (e.g., contemporaneously) with the detected first vehicle-control gesture. In some embodiments, the processor may operate the vehicle to implement the first vehicle action in response to determining that the first vehicle action is not safe for the vehicle or occupants, and determining that the detected first vehicle-control gesture includes the added indication that the drastic vehicle operation is intended by the first passenger.

Figure 8A:
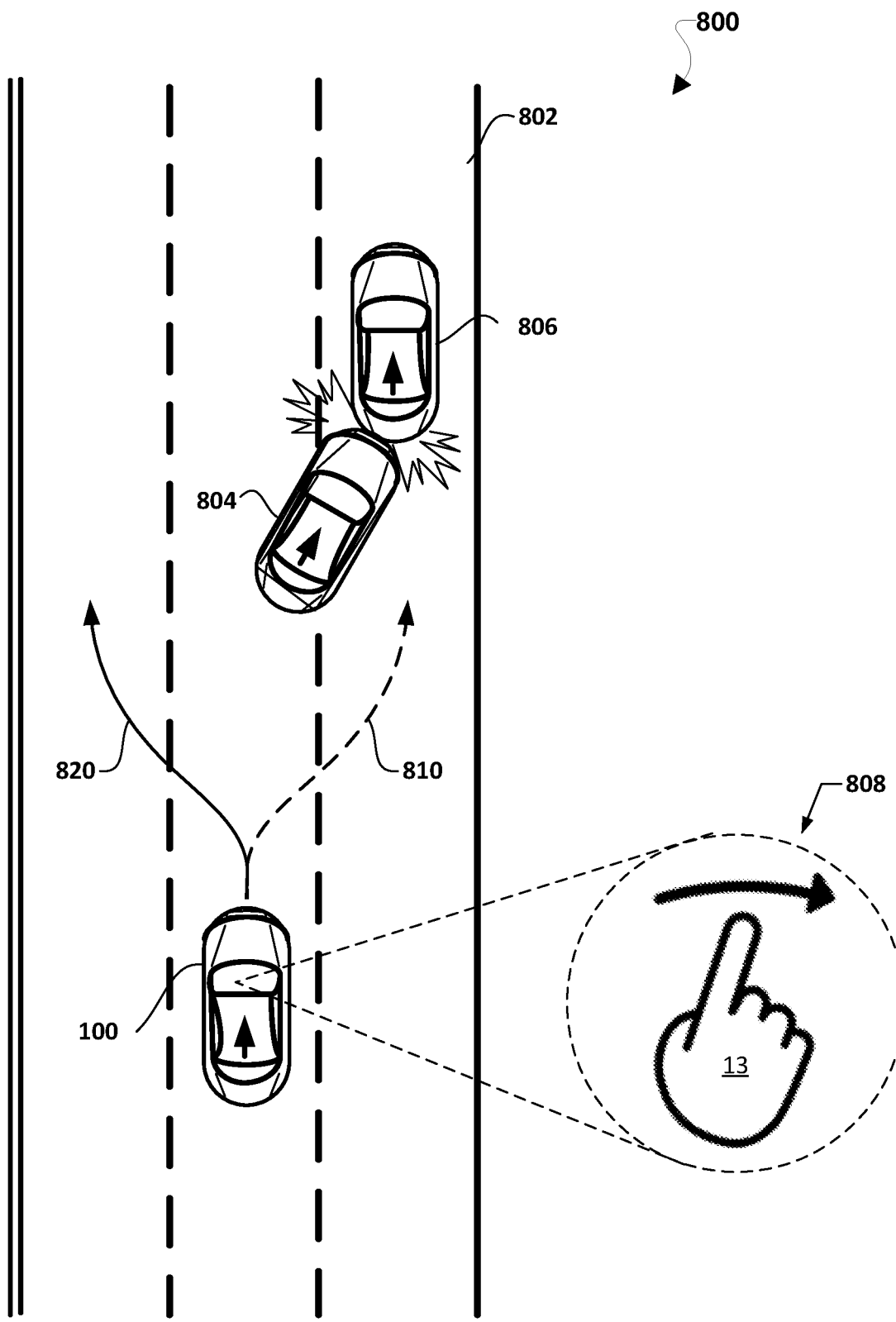
FIGS. 8A and 8B illustrate examples of vehicles operating based on vehicle-control gestures in accordance with various embodiments.
Figure 8B:
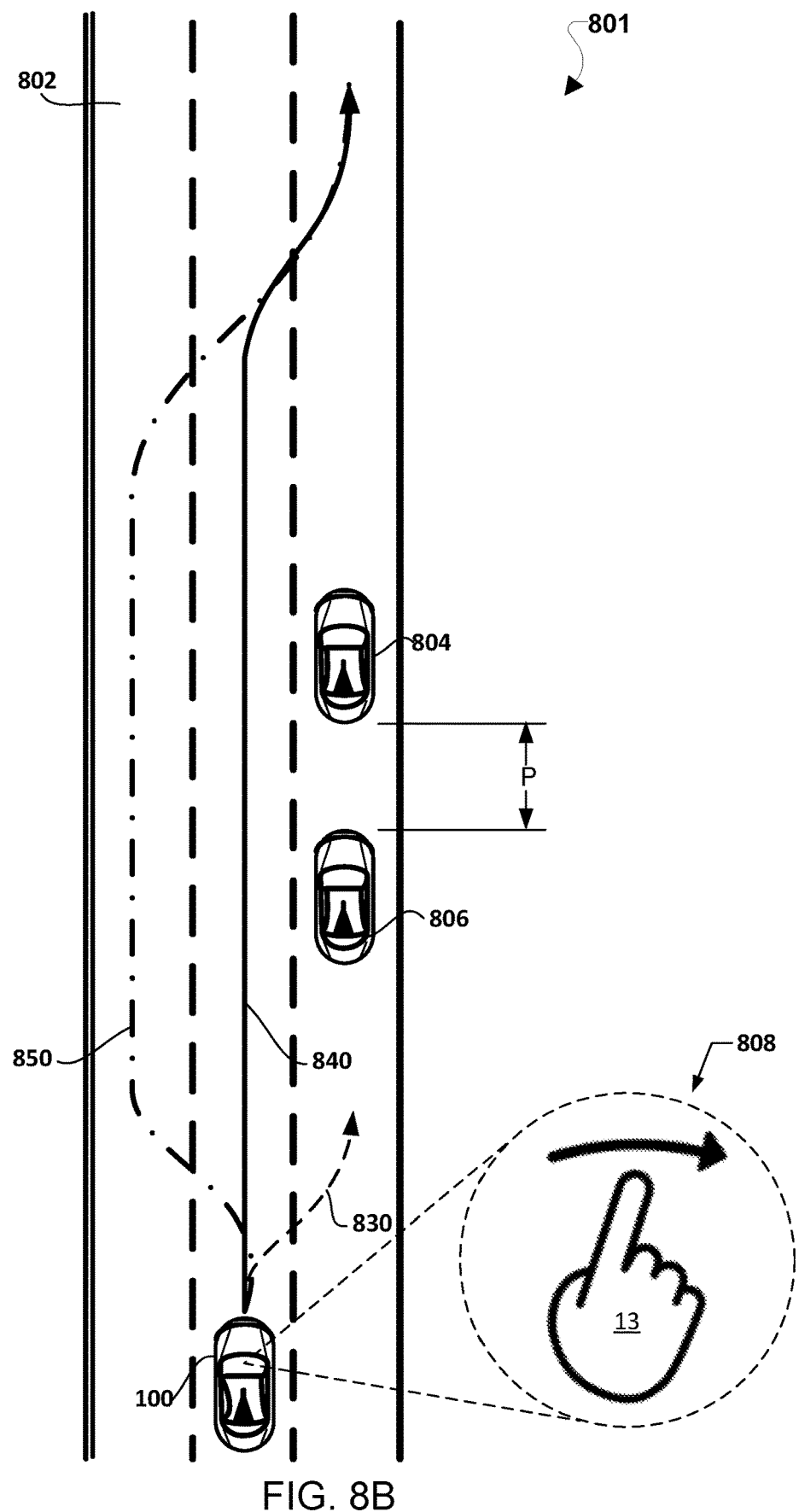

FIGS. 8A and 8B illustrate example situations 800, 801 in which a processor of a vehicle 100, which is approaching two other vehicles 804, 806, and the processor overrides a passenger's vehicle-control gesture in accordance with various embodiments. With reference to FIGS. 1A-8B, the three vehicles 804, 806, 100 are all traveling in the same direction on a roadway 802. The roadway 802 happens to be a three-lane road. The third vehicle 100 may be a semi-autonomous vehicle in accordance with various embodiments. The methods and systems of various embodiments may be applied to any pathway, whether or not it is a paved and clearly marked road.

With reference to FIG. 8A, the two lead vehicles 804, 806 have collided, blocking the middle and right lanes (i.e., the middle and furthest right lane in the orientation shown in FIG. 8), as the third vehicle 100 approaches the collision in the middle lane. In accordance with various embodiments, a processor of the third vehicle 100 has detected a vehicle-control gesture 808 performed by a passenger 13 (e.g., the rear-seat passenger 13 in FIG. 2B). Although, the passenger 13 is in a rear seat, in some embodiments the processor may recognize and accept vehicle-control gestures from passengers in any seat within the vehicle 100. For example, a generic rear-seated passenger profile may be (but not necessarily) applied by the processor for determining a first vehicle action 810 that corresponds to the vehicle-control gesture 808 performed by the passenger 13. For example, since a rear-seat passenger 13 may have limited or even partially obstructed visibility, the generic rear-seated passenger profile may more easily over-ride commands from that type of passenger. In this instance, the first vehicle action 810 would steer the third vehicle 100 into the right-hand lane, which is blocked by the collision.

In the illustrated situation in FIG. 8A, the processor of the third vehicle 100 may determine whether the first vehicle action 810 associated with the detected first vehicle-control gesture 808 is safe for the vehicle 100 to execute. Considering that the first vehicle action 810 would either lead to the third vehicle 100 also being involved in the collision or cause the third vehicle 100 to have to come to a stop very suddenly to avoid the impact. In this situation, the processor may conclude that the first vehicle action 810 indicated by the passenger 13 is unsafe for the vehicle 100 and/or passengers. In response to determining that the first vehicle action 810 is not safe for the vehicle 100 to execute, the processor may determine a second vehicle action 820 that is a safer alternative to the first vehicle action 810 in. In the illustrated example, the second vehicle action 820 involves the third vehicle 100 steering into the left-hand lane, which avoids the accident.

In accordance with some embodiments, the processor of the third vehicle 100 may determine whether the first vehicle action 810 includes an unusual vehicle operation. In the illustrated example, although the first vehicle action 810 would require the vehicle to decelerate to a stop very suddenly (i.e., an unusual maneuver), if the processor can perform the vehicle action safely, it may do so. For example, in addition to changing to the furthest right lane, the vehicle may need to move slightly or entirely to the right shoulder, but can still come to a stop behind the second lead vehicle 806. Alternatively, the vehicle may automatically perform the second vehicle action 820 and then come to a stop in the right land ahead of the two lead vehicles 804, 806. Thus, regardless of whether the passenger 13 provided added indications that the passenger 13 meant to perform the first vehicle-control gesture 808, which would result in a sudden and dangerous stop, the processor may operate the third vehicle 100 to implement the second vehicle action 820 that is a safer alternative to the first vehicle action 810 in response to determining that the unusual vehicle operation is not safe for the vehicle 100 or passenger 13. In addition, the processor may determine that such sudden breaking-type maneuvers require additional vehicle actions, such as turning on the hazard lights, locking the seatbelts, changing headlight settings, reducing entertainment system volume, etc., which the processor may automatically execute.

FIG. 8B illustrates a situation in which two lead vehicles 804, 806 are both traveling in the furthest right lane with the second lead vehicle 806 tailgating the first lead vehicle 804 (i.e., driving at a dangerously close proximity P, considering the speed of the two lead vehicles 804, 806). Meanwhile, the third vehicle 100 is approaching the two lead vehicles in the middle lane, and a processor of the third vehicle 100 has detected a vehicle-control gesture 808 performed by the passenger 13 (e.g., the rear-seat passenger 13 in FIG. 2B). In some embodiments, the processor executing the vehicle-control gesture determination module 610 may not use a passenger profile (e.g., if no passenger profile is available for the designated driver and/or other passengers), but rather uses generic settings for normalizing vehicle-control gestures for determining a third vehicle action 830 that corresponds to the vehicle-control gesture 808 performed by the passenger 13. Alternatively, the processor executing the vehicle-control gesture determination module 610 may use a default passenger profile or a profile preselected for the designated driver or other passenger providing vehicle-control gestures. In this instance, the third vehicle action 830 would steer the third vehicle 100 into the right-hand lane, closely behind the second lead vehicle 806.

In the situation illustrated in FIG. 8B, the processor of the third vehicle 100 may determine whether the third vehicle action 830 associated with the detected first vehicle-control gesture 808 is safe for the third vehicle 100 to execute. Considering that the third vehicle action 830 would lead to the third vehicle 100 following closely behind the second lead vehicle 806, such that if the first or second lead vehicle 804, 806 stopped suddenly, the third vehicle 100 may not be able to avoid a collision. In this situation, the processor may conclude that the third vehicle action 830 indicated by the passenger 13 is unsafe for the third vehicle 100 and/or passengers. In response to determining that the third vehicle action 830 is not safe for the third vehicle 100 to execute, the processor may determine a fourth vehicle action 840 that is a safer alternative to the third vehicle action 830. In the illustrated example, the fourth vehicle action 840 involves the third vehicle 100 delaying the lane-change maneuver associated with the first vehicle action 830 (e.g., a delay of 10 seconds), until after the vehicle 100 has safely overtaken the two lead vehicle 804, 806. In this way, the processor of the third vehicle 100 may determine a first level of safety associated with the third vehicle action 830, which may be below a safety threshold in this regard. Accordingly, the processor of the third vehicle 100 may determine whether an added delay before executing the lane-change maneuver would be not only safer than the third vehicle action, but also be associated with a second level of safety that is above the safety threshold. In the illustrated example, the processor may determine a fourth vehicle action 840, which is similar to the third vehicle action 830, but include a delay so the third vehicle 100 overtakes the two lead vehicles 804, 806.

In some implementations, after the processor determined that the third vehicle action 830 in FIG. 8B may be unsafe, the processor may prompt the passenger 13 for input (e.g., a verbal inquiry to the passenger saying, "It would be safer to pass the vehicles ahead in the right lane before changing lanes, would you prefer to pass the vehicles ahead before changing lanes?"). In response, the passenger 13 may provide an input (e.g., a verbal response or another vehicle-control gesture), which may be interpreted by the processor (e.g., using the added indication determination module 626). Thus, the passenger 13 may provide an input that agrees with the proposed fourth vehicle action 840, disagrees and provides an added indication that the third vehicle action 830 is desired (e.g., emphatically repeating the vehicle-control gesture 808), or provides another input (e.g., a new vehicle-control gesture or simply canceling the third vehicle action 830).

In some implementations, in addition to determining that the third vehicle action 830 is unsafe in FIG. 8B, the vehicle may execute a different maneuver (than simply adding a delay) that achieves what the original vehicle-control gesture 808 intended. For example, the processor may detect that one or both of the lead vehicles 804, 806 is/are driving erratically (e.g., swerving in the lane) or some other condition making continued travel in the center land questionably safe. Thus, rather than just suggesting a delay action, such as the fourth vehicle action 840, the processor may prompt the passenger 13 for input regarding or automatically execute a fifth vehicle action 850 (i.e., an alternative vehicle action). For instance, the fifth vehicle action 850 may involve changing lanes to the far left lane (and in some cases a temporary increase in speed), before overtaking the two lead vehicles, and then changing lanes to the far right lane (and in some cases reverting to the original speed or other speed before passing the other vehicles), thus still executing a maneuver that achieves what the original vehicle-control gesture 808 intended, but in a safer way. Once again, the passenger 13 may provide inputs (e.g., a verbal response or another vehicle-control gesture), which may be interpreted by the processor (e.g., using the added indication determination module 626), confirming the fifth vehicle action 850, canceling the original control gesture 808, providing another input, or the like. As a further alternative, the processor need not wait for passenger input (e.g., an added indication) after determining the initial vehicle-control gesture is unsafe, and may execute the safest vehicle action available that comes close to complying with the original control gesture 808 and operating the vehicle safely.

FIGS. 9A, 9B, 9C, and 9D illustrate operations of methods 900, 903, 905, and 907 respectively, for operating a vehicle based on vehicle-control gestures by a passenger in accordance with various embodiments. With reference to FIGS. 1A-9D, the methods 900, 903, 905, and 907 may be implemented in a processor (e.g., 164), a processing device (e.g., 500), and/or a control unit (e.g., 140) (variously referred to as a "processor") of a vehicle (e.g., 100). In some embodiments, the methods 900, 903, 905, and 907 may be performed by one or more layers within a vehicle management system stack, such as a vehicle management system (e.g., 400, 450). In some embodiments, the methods 900, 903, 905, and 907 may be performed by a processor independently from, but in conjunction with, a vehicle control system stack, such as the vehicle management system. For example, the methods 900, 903, 905, and 907 may be implemented as a stand-alone software module or within dedicated hardware that monitors data and commands from/within the vehicle management system and is configured to take actions and store data as described.

Figure 9A:
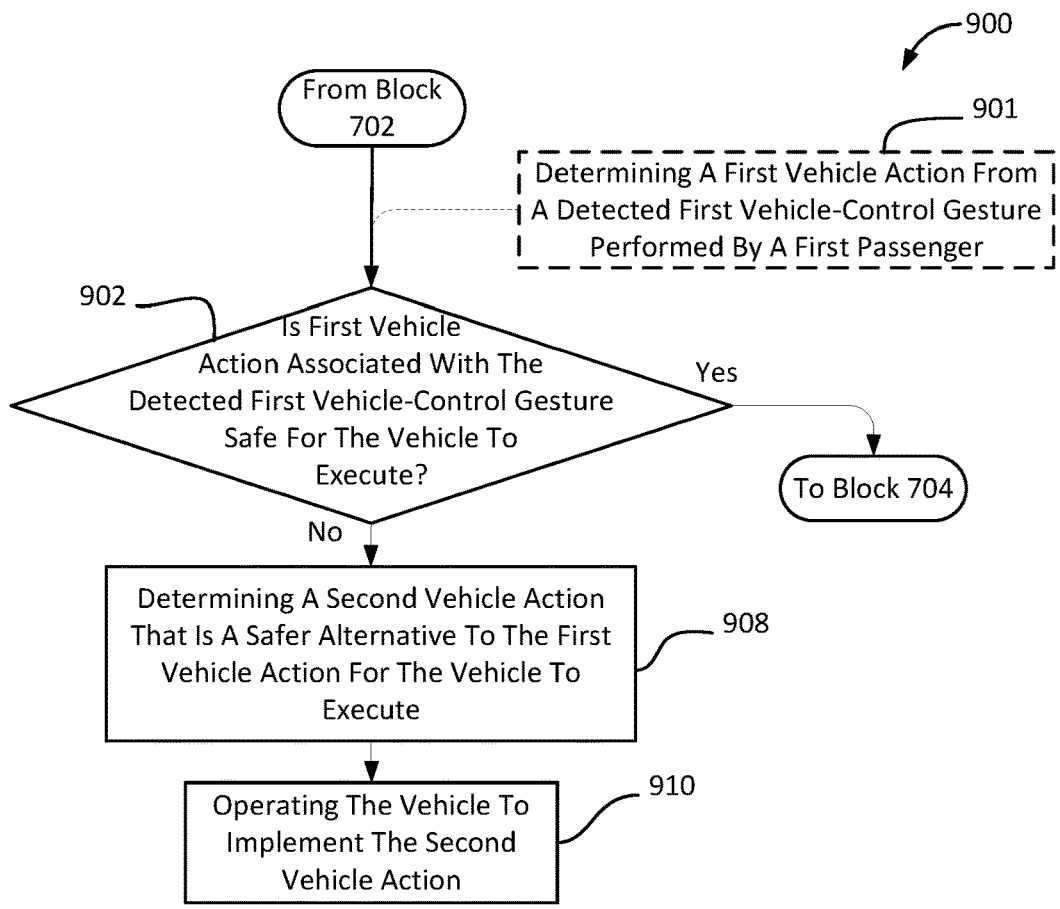
FIGS. 9A, 9B, 9C, and 9D are process flow diagrams of example methods for a vehicle to operate based on vehicle-control gestures by a passenger according to various embodiments.

FIG. 9A illustrates a method 900 for operating the vehicle based on vehicle-control gestures by a passenger in accordance with various embodiments.

In some implementations of the method 900, the determinations in determination block 902 may follow the operations in block 702 (as described with regard to the method 700). However, in an alternative implementation of the method 900, the determinations in determination block 902 may follow the operations in alternative block 901.

In alternative block 901, a vehicle processor may determine a first vehicle action from a detected first vehicle-control gesture performed by a first passenger. For example, the processor may detect a vehicle-control gesture in the form of a passenger circling their finger/hand up past their face and back down again repeatedly (i.e., an indication to speed up) or other gesture or input. Using a knowledge-base to recognize such movement, the processor may determine that this gesture means the passenger wants the vehicle to accelerate. In some embodiments, means for performing the operations of alternative block 901 may include a processor (e.g., 164) coupled to one or more sensors (e.g., 101) and electronic storage (e.g., 635). To make the determination in alternative block 901, the processor may use the vehicle action determination module (e.g., 612).

In determination block 902, following the operations in block 702 (as described with regard to the method 700), a vehicle processor may determine whether the first vehicle action associated with the detected first vehicle-control gesture is safe for the vehicle to execute. For example, as described above with regard to FIG. 8, the processor may detect a vehicle-control gesture that is dangerous, unsafe, and/or very unusual. After applying a passenger profile assigned to the rear seat in which the passenger is seated, the processor may determine this gesture means the passenger wants the vehicle to come to a sudden stop. In some embodiments, means for performing the operations of determination block 902 may include a processor (e.g., 164) coupled to one or more sensors (e.g., 101), electronic storage (e.g., 635), and a vehicle management system (e.g., 400, 450). To make the determination in determination block 902, the processor may use the vehicle action safety determination module (e.g., 618).

In response to the processor determining that the first vehicle action associated with the detected first vehicle-control gesture is safe for the vehicle to execute (i.e., determination block 902="Yes"), the processor may follow the operations in block 704 as described above with regard to the method 700.

In response to the processor determining that the first vehicle action associated with the detected first vehicle-control gesture is not safe for the vehicle to execute (i.e., determination block 902="No"), the processor may determine a second vehicle action that is a safer alternative to the first vehicle action for the vehicle to execute in block 908. In some embodiments, means for performing the operations of determination block 902 may include a processor (e.g., 164) to one or more sensors (e.g., 101), electronic storage (e.g., 635), a vehicle management system (e.g., 400, 450), and the vehicle action safety determination module (e.g., 618).

In block 908, the vehicle processor may determine a second vehicle action that is a safer alternative to the first vehicle action for the vehicle to execute. For example, the processor may determine an alternative vehicle action. In some embodiments, means for performing the operations of block 908 may include a processor (e.g., 164) coupled to electronic storage (e.g., 635) and a vehicle management system (e.g., 400, 450). To make the determination in block 908, the processor may use the alternative vehicle action determination module (e.g., 620).

In block 910, the vehicle processor may operate the vehicle to implement the second vehicle action in response to determining that the second vehicle action is a safer alternative to the first vehicle action. For example, the processor may determine the first vehicle action is dangerous and/or likely to cause a collision. In some embodiments, means for performing the operations of block 910 may include a processor (e.g., 164) coupled to electronic storage (e.g., 635) and a vehicle management system (e.g., 400, 450). To make the determination in block 910, the processor may use the vehicle operation module (e.g., 629).

In some embodiments, the processor may repeat the operations in determination block 902 and blocks 908 and 910 to periodically or continuously operate the vehicle based on vehicle-control gestures by a passenger.

Figure 9B:
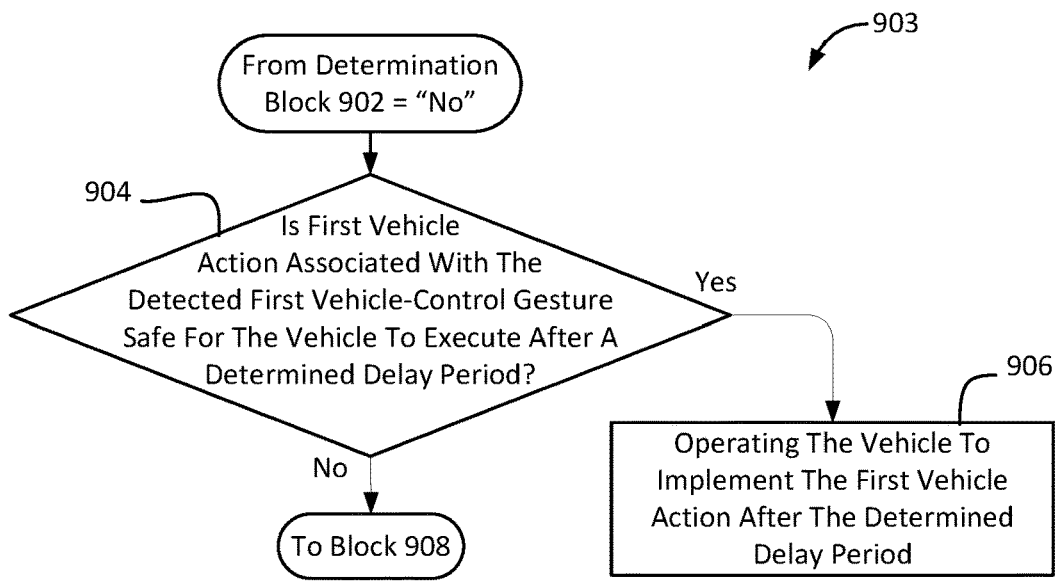

FIG. 9B illustrates a method 903 for operating the vehicle based on vehicle-control gestures by a passenger in accordance with various embodiments.

In response to the processor determining that the first vehicle action associated with the detected first vehicle-control gesture is not safe for the vehicle to execute (i.e., determination block 902="No"), a vehicle processor may determine whether the first vehicle action associated with the detected first vehicle-control gesture is safe for the vehicle to execute after a determined delay period in determination block 904. For example, as described above with regard to FIG. 8, if the vehicle were to immediately steer into the right-hand lane it would be dangerous, but if the two lead vehicles (804, 806) shift into the two left lanes or the left-most lane, then steering into the right-hand land after a brief delay (e.g., one or two seconds of pumping the breaks) may be the safest route. Thus, the processor may determine whether a delay period might change the determination made in determination block 902 of the method 900. In some embodiments, means for performing the operations of determination block 904 may include a processor (e.g., 164) coupled to one or more sensors (e.g., 101), electronic storage (e.g., 635), and a vehicle management system (e.g., 400, 450). To make the determination in determination block 904, the processor may use the delay period assessment module (e.g., 622).

In response to the processor determining that the first vehicle action associated with the detected first vehicle-control gesture (e.g., 63) is safe for the vehicle to execute after the determined delay period (i.e., determination block 904="Yes"), the processor may operate the vehicle to implement the first vehicle action after the determined delay period in block 906.

In response to the processor determining that the first vehicle action associated with the detected first vehicle-control gesture is not safe for the vehicle to execute (i.e., determination block 902="No"), the processor may follow the operations in block 908 of the method 900 as described. In some embodiments, means for performing the operations of determination block 904 may include a processor (e.g., 164) to one or more sensors (e.g., 101), electronic storage (e.g., 635), a vehicle management system (e.g., 400, 450), the vehicle action safety determination module (e.g., 618), and the delay period assessment module 622.

In some embodiments, the processor may repeat any or all of the operations in determination block 904 and block 906 to repeatedly or continuously determine how to operate the vehicle as needed.

Figure 9C:
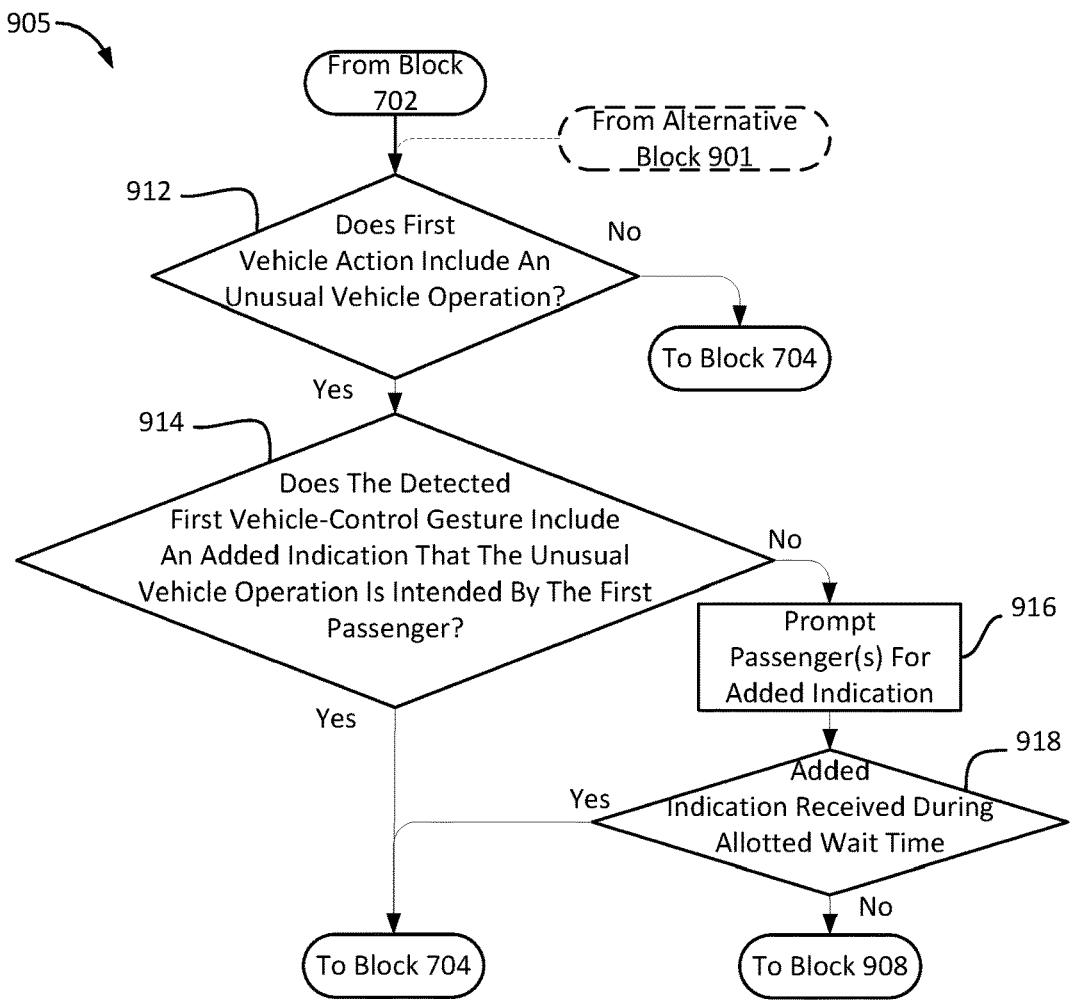

FIG. 9C illustrates a method 905 for operating the vehicle based on vehicle-control gestures by a passenger in accordance with various embodiments.

Following the operations in block 702 of the method 700 or alternative block 901 of the method 900 as described, a vehicle processor may determine whether the first vehicle action includes an unusual vehicle operation in determination block 912. For example, if the first vehicle action includes a maneuver that has never been performed before, is erratic, and/or dangerous the processor may conclude the maneuver is unusual. Thus, the processor may assess and determine the first vehicle action includes an unusual vehicle operation in determination block 912 of the method 905. In some embodiments, means for performing the operations of determination block 912 may include a processor (e.g., 164) coupled to one or more sensors (e.g., 101), electronic storage (e.g., 635), and a vehicle management system (e.g., 400, 450). To make the determination in determination block 912, the processor may use the unusual operation safety assessment module (e.g., 628).

In response to the processor determining that the first vehicle action includes an unusual vehicle operation (i.e., determination block 912="No"), the processor may operate the vehicle to implement the first vehicle action in block 704 of method 700 as described.

In response to the processor determining that the first vehicle action includes an unusual vehicle operation (i.e., determination block 912="Yes"), the processor may determine whether the detected first vehicle-control gesture includes an added indication that the unusual vehicle operation is intended by the first passenger in determination block 914.

In some embodiments, means for performing the operations of determination block 912 may include a processor (e.g., 164) to one or more sensors (e.g., 101), electronic storage (e.g., 635), a vehicle management system (e.g., 400, 450), and the added indication determination module (e.g., 626).

In determination block 914, the vehicle processor may determine whether the detected first vehicle-control gesture includes an added indication that the unusual vehicle operation is intended by the first passenger. For example, the passenger may exaggerate a gesture, repeated the gesture, perform a gesture more quickly than usual, or provide a non-visual input (e.g., an audio input) received in conjunction with the detected first vehicle-control gesture.

In response to the processor determining that the detected first vehicle-control gesture includes an added indication that the unusual vehicle operation is intended by the first passenger (i.e., determination block 914="Yes"), the processor may operate the vehicle to implement the first vehicle action in block 704 of the method 700 as described.

In response to the processor determining that the detected first vehicle-control gesture does not include an added indication that the unusual vehicle operation is intended by the first passenger (i.e., determination block 914="No"), the processor may prompt passenger(s) (e.g., the first passenger) for an added indication in block 916.

In block 916, one or more passengers may be prompted (e.g., tone, light, vibration, etc.) for an added indication that the detected first vehicle-control gesture was intended or is now intended. As described with regard to the added indication determination module 626, the prompt to the passenger(s) may include details that inform the passenger(s) about or otherwise correspond to the type of added indication that is needed. In some implementations, the processor may only process responses from the passenger that made the detected first vehicle-control gesture. Alternatively, the processor may accept responses from any designated driver or from any passenger. To give the passenger(s) time to respond, the prompt for an added indication may give the passenger(s), or at least the passenger making the detected first vehicle-control gesture, an allotted time to respond before the processor moves-on and determines an alternative action in block 908. For example, the allotted time may be 3-5 seconds. In some embodiments, the length of the time may depend on current circumstances. For example, when the vehicle is traveling at high speeds the processor may wait a short amount of time before taking an action without an added indication than when the vehicle traveling at low speeds. Similarly, other circumstances, such as location, weather conditions, time of day/year, lighting, etc., may be taken into account in determining how long the processor should wait for an added indication from one or more passengers. The means for prompting passengers for the operations of block 916 may include a processor (e.g., 164), a speaker (e.g., through a vehicle entertainment system), other vehicle computing system(s) 604, external resources (e.g., 630), electronic storage (e.g., 635), a vehicle management system (e.g., 400, 450), and the added indication determination module (e.g., 626).

During the allotted time (i.e., before expiration of the allotted time), the processor may determine whether an added indication is received in determination block 918. The means for performing the operations of determination block 918 may include a processor (e.g., 164), electronic storage (e.g., 635), a vehicle management system (e.g., 400, 450), and the added indication determination module (e.g., 626).

In response to receiving an added indication during the allotted time (i.e., determination block 918="Yes"), the processor may operate the vehicle to implement the first vehicle action in block 704 of the method 700 as described.

In response to not receiving an added indication during the allotted time (i.e., determination block 918="No"), the processor may follow the operations in block 908 of the method 900 as described.

In some embodiments, means for performing the operations of determination block 914 may include a processor (e.g., 164) to one or more sensors (e.g., 101), electronic storage (e.g., 635), a vehicle management system (e.g., 400, 450), and the unusual operation safety assessment module (e.g., 628).

In some embodiments, the processor may repeat any or all of the operations in determination blocks 912 and 914 to repeatedly or continuously determine how to operate the vehicle as needed.

Figure 9D:
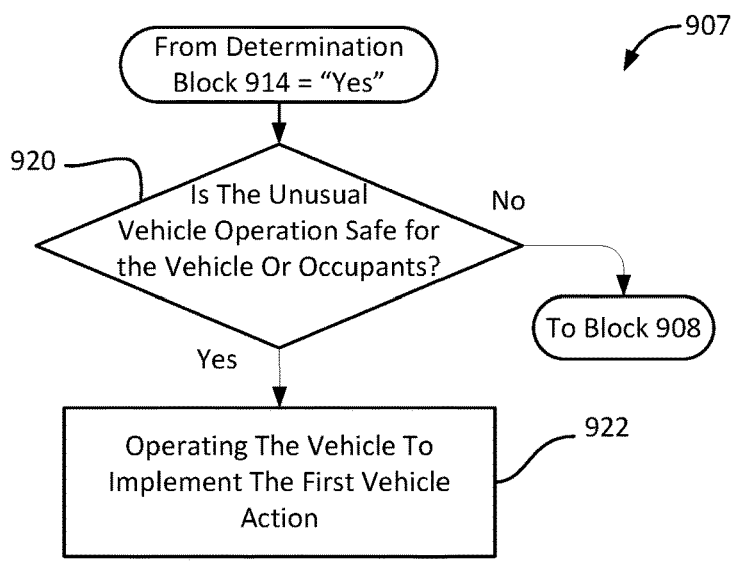

FIG. 9D illustrates method 907 for operating the vehicle based on vehicle-control gestures by a passenger in accordance with various embodiments.

In response to determining that the detected first vehicle-control gesture includes an added indication that the unusual vehicle operation is intended by the first passenger (i.e., determination block 914="Yes"), the vehicle processor may determine whether the unusual vehicle operation is safe for the vehicle or occupants in determination block 920. For example, even though the passenger gave an indication that the unusual vehicle operation was intentional, if the unusual vehicle operation is unsafe, a processor may reject or prevent the vehicle from executing the operation. Thus, the processor may assess and determine how safe the unusual vehicle operations is for the vehicle and occupants in determination block 920 of the method 907. In some embodiments, means for performing the operations of determination block 920 may include a processor (e.g., 164) coupled to one or more sensors (e.g., 101), electronic storage (e.g., 635), and a vehicle management system (e.g., 400, 450). To make the determination in determination block 920, the processor may use the unusual operation safety assessment module (e.g., 628).

In response to the processor determining that the unusual vehicle operation is not safe (i.e., determination block 920="No"), the processor may determine a second vehicle action that is a safer alternative to the first vehicle action for the vehicle to execute in block 908 as described above with regard to the method 700.

In response to the processor determining that the unusual vehicle operation is safe (i.e., determination block 920="Yes"), the processor may operate the vehicle to implement the first vehicle action in block 922.

In some embodiments, means for performing the operations of determination block 922 may include a processor (e.g., 164) to one or more sensors (e.g., 101), electronic storage (e.g., 635), a vehicle management system (e.g., 400, 450), and the unusual operation safety assessment module (e.g., 628).

In some embodiments, the processor may repeat any or all of the operations in determination block 920 and block 922 to repeatedly or continuously determine how to operate the vehicle as needed.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method executed by a processor of a vehicle for operating the vehicle in response to vehicle-control gestures by a passenger, the method comprising:
   determining a first vehicle action by applying a first passenger profile to a detected first vehicle-control gesture performed by a first passenger, wherein the first passenger profile is selected from a plurality of passenger profiles to normalize vehicle-control gestures received from the first passenger;
   determining whether the detected first vehicle-control gesture includes an indication that a vehicle operation is intended by the first passenger, wherein the included indication that the vehicle operation is intended by the first passenger includes a first instance of a first gesture performed by the first passenger and a second instance of the first gesture performed by the first passenger within an allotted time of performing the first instance of the first gesture, wherein vehicle operations are configured to cause the vehicle to implement vehicle actions and wherein the first instance of the first gesture comprises at least one movement with a measurable parameter and wherein the second instance of the first gesture exhibits an increase in the measurable parameter relative to the first instance of the first gesture; and
   operating the vehicle to implement the first vehicle action in response to determining that the detected first vehicle-control gesture includes the indication that the vehicle operation is intended by the first passenger.

2. The method of claim 1, wherein the plurality of passenger profiles includes a second passenger profile designated for a second passenger, wherein the first and second passenger profiles normalize vehicle-control gestures differently.

3. The method of claim 2, further comprising:
   identifying the first passenger based on at least one of a position of the first passenger in the vehicle, an input by the first passenger, or recognition of the first passenger; and
   selecting the first passenger profile based on the identity of the first passenger.

4. The method of claim 1, wherein the first passenger profile is customized to the first passenger from training inputs previously receiving from the first passenger.

5. The method of claim 1, further comprising:
   receiving, from a remote computing device, the first passenger profile for application to vehicle-control gestures.

6. The method of claim 1, further comprising:
   determining whether the first vehicle action associated with the detected first vehicle-control gesture is safe for the vehicle to execute;
   determining a second vehicle action that is a safer alternative to the first vehicle action in response to determining the first vehicle action is not safe for the vehicle to execute; and
   operating the vehicle to implement the second vehicle action.

7. The method of claim 1, further comprising:
   determining, prior to a determined delay period, whether the first vehicle action associated with the detected first vehicle-control gesture is safe for the vehicle to execute after a determined delay period in response to determining that the first vehicle action is not safe for the vehicle and occupants before the delay period ends; and
   operating the vehicle to implement the first vehicle action after the determined delay period in response to determining that the first vehicle action associated with the detected first vehicle-control gesture is safe for the vehicle to execute after the determined delay period.

8. The method of claim 1, wherein the added indication includes a non-visual input received in conjunction with the detected first vehicle-control gesture.

9. The method of claim 1, further comprising:
   determining whether the vehicle operation intended by the first passenger is safe for the vehicle or occupants; and
   operating the vehicle to implement a second vehicle action that is a safer alternative to the first vehicle action in response to determining that the vehicle operation intended by the first passenger is not safe for the vehicle or occupants.

10. The method of claim 1, wherein the measurable parameter comprises one of an angle or a distance of the at least one movement.

11. A vehicle control system configured for use in an autonomous vehicle, comprising:
    a sensor configured to detect a vehicle-control gesture performed by a passenger; and
    a processor coupled to the sensor and configured with processor-executable instructions for operating the vehicle in response to vehicle-control gestures by a passenger to:
       determine a first vehicle action by applying a first passenger profile to a detected first vehicle-control gesture performed by a first passenger, wherein the first passenger profile is selected from a plurality of passenger profiles to normalize vehicle-control gestures received from the first passenger;
       determine whether the detected first vehicle-control gesture includes an indication that a vehicle operation is intended by the first passenger, wherein the included indication that the vehicle operation is intended by the first passenger includes a first instance of a first gesture performed by the first passenger and a second instance of the first gesture performed by the first passenger within an allotted time of performing the first instance of the first gesture, wherein vehicle operations are configured to cause the vehicle to implement vehicle actions and wherein the first instance of the first gesture comprises at least one movement with a measurable parameter and wherein the second instance of the first gesture exhibits an increase in the measurable parameter relative to the first instance of the first gesture; and
       operate the vehicle to implement the first vehicle action in response to determining that the detected first vehicle-control gesture includes the indication that the vehicle operation is intended by the first passenger.

12. The vehicle control system of claim 11, wherein the processor is further configured with processor-executable instructions such that the plurality of passenger profiles includes a second passenger profile designated for a second passenger, wherein the first and second passenger profiles normalize vehicle-control gestures differently.

13. The vehicle control system of claim 12, wherein the processor is further configured with processor-executable instructions to:
identify the first passenger based on at least one of a position of the first passenger in the vehicle, an input by the first passenger, or recognition of the first passenger; and
select the first passenger profile based on the identity of the first passenger.

14. The vehicle control system of claim 11, wherein the processor is further configured with processor-executable instructions such that the first passenger profile is customized to the first passenger from training inputs previously received from the first passenger.

15. The vehicle control system of claim 11, wherein the processor is further configured with processor-executable instructions to:
receive, from a remote computing device, the first passenger profile for application to vehicle-control gestures.

16. The vehicle control system of claim 11, wherein the processor is further configured with processor-executable instructions to:
determine whether the first vehicle action associated with the detected first vehicle-control gesture is safe for the vehicle to execute;
determine a second vehicle action that is a safer alternative to the first vehicle action in response to determining the first vehicle action is not safe for the vehicle to execute; and
operate the vehicle to implement the second vehicle action.

17. The vehicle control system of claim 11, wherein the processor is further configured with processor-executable instructions to:
determining, prior to a determined delay period, whether the first vehicle action associated with the detected first vehicle-control gesture is safe for the vehicle to execute after the determined delay period in response to determining that the first vehicle action is not safe for the vehicle and occupants before the delay period ends; and
operate the vehicle to implement the first vehicle action after the determined delay period in response to determining that the first vehicle action associated with the detected first vehicle-control gesture is safe for the vehicle to execute after the determined delay period.

18. The vehicle control system of claim 11, wherein the processor is further configured with processor-executable instructions such that the added indication includes a non-visual input received in conjunction with the detected first vehicle-control gesture.

19. The vehicle control system of claim 11, wherein the processor is further configured with processor-executable instructions to:
determine whether the vehicle operation intended by the first passenger is safe for the vehicle or occupants; and
operate the vehicle to implement a second vehicle action that is a safer alternative to the first vehicle action in response to determining that the vehicle operation intended by the first passenger is not safe for the vehicle or occupants.

20. The vehicle control system of claim 11, wherein the measurable parameter comprises one of an angle or a distance of the at least one movement.

21. A non-transitory processor-readable medium having stored thereon processor-executable instructions configured to cause a processor of a vehicle control system to operate a vehicle in response to vehicle-control gestures by a passenger by performing operations comprising:
determining a first vehicle action by applying a first passenger profile to a detected first vehicle-control gesture performed by a first passenger, wherein the first passenger profile is selected from a plurality of passenger profiles to normalize vehicle-control gestures received from the first passenger;
determining whether the detected first vehicle-control gesture includes an indication that a vehicle operation is intended by the first passenger, wherein the included indication that the vehicle operation is intended by the first passenger includes a first instance of a first gesture performed by the first passenger and a second instance of the first gesture performed by the first passenger within an allotted time of performing the first instance of the first gesture, wherein vehicle operations are configured to cause the vehicle to implement vehicle actions and wherein the first instance of the first gesture comprises at least one movement with a measurable parameter and wherein the second instance of the first gesture exhibits an increase in the measurable parameter relative to the first instance of the first gesture; and
operating the vehicle to implement the first vehicle action in response to determining that the detected first vehicle-control gesture includes the indication that the vehicle operation is intended by the first passenger.

22. The non-transitory processor-readable medium of claim 21, wherein the stored processor-executable instructions are configured to cause a processor of the vehicle control system to perform operations such that the plurality of passenger profiles includes a second passenger profile designated for a second passenger, wherein the first and second passenger profiles normalize vehicle-control gestures differently.

23. The non-transitory processor-readable medium of claim 22, wherein the stored processor-executable instructions are configured to cause a processor of the vehicle control system to perform operations further comprising:
identifying the first passenger based on at least one of a position of the first passenger in the vehicle, an input by the first passenger, or recognition of the first passenger; and
selecting the first passenger profile based on the identity of the first passenger.

24. The non-transitory processor-readable medium of claim 21, wherein the stored processor-executable instructions are configured to cause a processor of the vehicle control system to perform operations further comprising:
receiving, from a remote computing device, the first passenger profile for application to vehicle-control gestures.

25. The non-transitory processor-readable medium of claim 21, wherein the stored processor-executable instructions are configured to cause a processor of the vehicle control system to perform operations further comprising:
determining whether the first vehicle action associated with the detected first vehicle-control gesture is safe for the vehicle to execute;
determining a second vehicle action that is a safer alternative to the first vehicle action in response to determining the first vehicle action is not safe for the vehicle to execute; and operating the vehicle to implement the second vehicle action.

26. The non-transitory processor-readable medium of claim 21, wherein the stored processor-executable instructions are configured to cause a processor of the vehicle control system to perform operations further comprising:
   determining, prior to a determined delay period, whether the first vehicle action associated with the detected first vehicle-control gesture is safe for the vehicle to execute after the determined delay period in response to determining that the first vehicle action is not safe for the vehicle and occupants before the delay period ends; and
   operating the vehicle to implement the first vehicle action after the determined delay period in response to determining that the first vehicle action associated with the detected first vehicle-control gesture is safe for the vehicle to execute after the determined delay period.

27. The non-transitory processor-readable medium of claim 21, wherein the stored processor-executable instructions are configured to cause a processor of the vehicle control system to perform operations such that the added indication includes a non-visual input received in conjunction with the detected first vehicle-control gesture.

28. The non-transitory processor-readable medium of claim 21, wherein the stored processor-executable instructions are configured to cause a processor of the vehicle control system to perform operations further comprising:
   determining whether the vehicle operation intended by the first passenger is safe for the vehicle or occupants; and
   operating the vehicle to implement a second vehicle action that is a safer alternative to the first vehicle action in response to determining that the vehicle operation intended by the first passenger is not safe for the vehicle or occupants.

29. The non-transitory processor-readable medium of claim 21, wherein the measurable parameter comprises one of an angle or a distance of the at least one movement.

30. A vehicle control system, comprising:
   means for determining a first vehicle action by applying a first passenger profile to a detected first vehicle-control gesture performed by a first passenger, wherein the first passenger profile is selected from a plurality of passenger profiles to normalize vehicle-control gestures received from the first passenger;
   means for determining whether the detected first vehicle-control gesture includes an indication that a vehicle operation is intended by the first passenger, wherein the included indication that the vehicle operation is intended by the first passenger includes a first instance of a first gesture performed by the first passenger and a second instance of the first gestured gesture performed by the first passenger within an allotted time of performing the first instance of the first gesture, wherein vehicle operations are configured to cause the vehicle to implement vehicle actions and wherein the first instance of the first gesture comprises at least one movement with a measurable parameter and wherein the second instance of the first gesture exhibits an increase in the measurable parameter relative to the first instance of the first gesture; and
   means for operating the vehicle to implement the first vehicle action in response to determining that the detected first vehicle-control gesture includes the indication that the vehicle operation is intended by the first pass.

* * * * *